US008000169B2

(12) United States Patent
Touge

(10) Patent No.: US 8,000,169 B2
(45) Date of Patent: Aug. 16, 2011

(54) OBJECT DETECTING APPARATUS, OPENING AND CLOSING CONTROL SYSTEM FOR VEHICLE USING OBJECT DETECTING APPARATUS, AND METHOD OF DETECTING UPSTROKE OF ENVELOPE

(75) Inventor: Hiroshi Touge, Ichinomiya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 319 days.

(21) Appl. No.: 12/410,120

(22) Filed: Mar. 24, 2009

(65) Prior Publication Data

US 2009/0242310 A1 Oct. 1, 2009

(30) Foreign Application Priority Data

Mar. 27, 2008 (JP) ................................. 2008-084917

(51) Int. Cl.
*G01S 15/93* (2006.01)
(52) U.S. Cl. ......................................................... 367/98
(58) Field of Classification Search ............... 367/95–98
See application file for complete search history.

(56) References Cited

U.S. PATENT DOCUMENTS

| 4,933,915 | A | * | 6/1990 | Bostrom | 367/99 |
| 7,376,047 | B2 | * | 5/2008 | Brown et al. | 367/98 |
| 7,379,389 | B2 | * | 5/2008 | Aikyo et al. | 367/96 |
| 7,417,922 | B2 | * | 8/2008 | Touge | 367/98 |
| 7,528,703 | B2 | * | 5/2009 | Touge | 340/435 |
| 2007/0024431 | A1 | * | 2/2007 | Touge | 340/436 |
| 2007/0076526 | A1 | * | 4/2007 | Aikyo et al. | 367/128 |
| 2007/0274159 | A1 | * | 11/2007 | Touge | 367/99 |
| 2008/0079537 | A1 | * | 4/2008 | Touge | 340/5.72 |
| 2009/0242310 | A1 | * | 10/2009 | Touge | 367/99 |
| 2009/0243826 | A1 | * | 10/2009 | Touge | 340/436 |

FOREIGN PATENT DOCUMENTS

| JP | 2005-69867 A | 3/2005 |
| JP | 2007-315892 A | 12/2007 |

\* cited by examiner

*Primary Examiner* — Dan Pihulic
(74) *Attorney, Agent, or Firm* — Buchanan Ingersoll & Rooney PC

(57) ABSTRACT

An object detecting apparatus detecting an object position based on a reflected wave generated by reflection of a transmitted ultrasonic wave from the object includes a transmitting portion transmitting the ultrasonic wave, a receiving portion receiving the ultrasonic waves as received signals, a detecting position detecting an envelope and an operation portion detecting a peak of each envelope and obtaining an approximate line with a maximum change amount of the envelope in a change amount increasing period set to a gradient of the approximate line, provided that the change amount increasing period is defined as a period that an amount of change per a predetermined unit time of the envelope, heading to the peak, continues to increase, the operation portion obtaining a time that a voltage value of the approximate line equals a reference value as a receipt time and detecting the object position based on the receipt time.

9 Claims, 14 Drawing Sheets

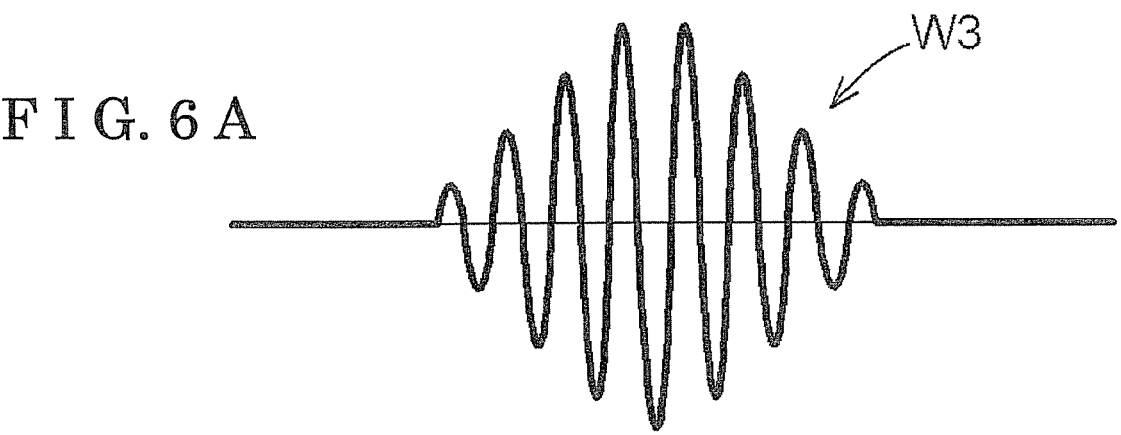
FIG. 6A
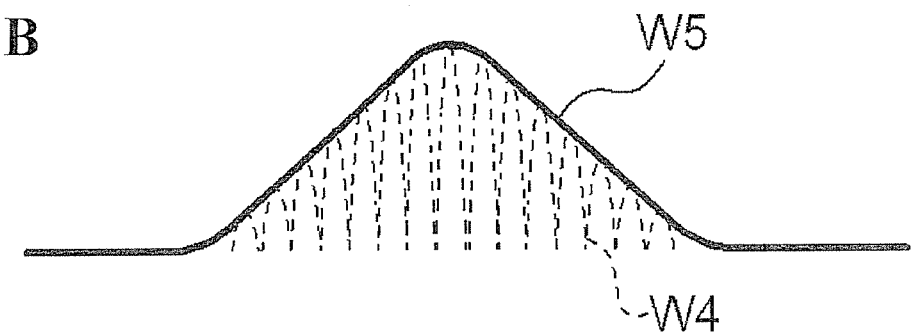
FIG. 6B
FIG. 7
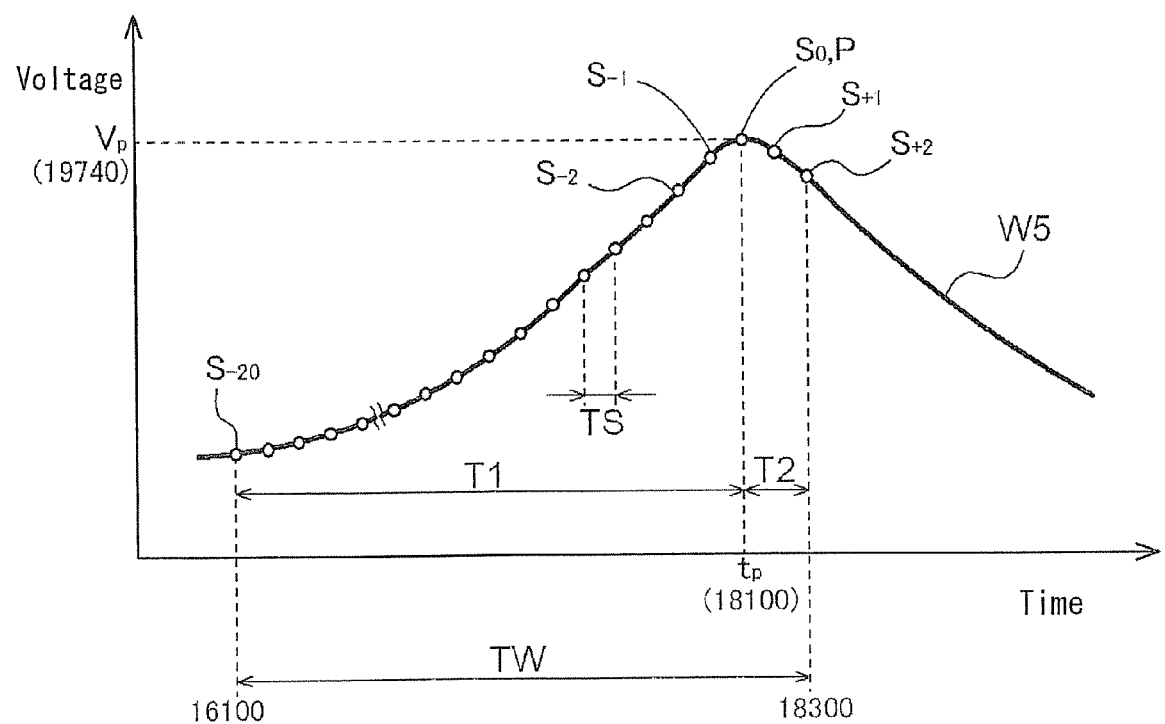

FIG. 11

| TS×17 previous data | | | | | | | | | | | | |
|---|---|---|---|---|---|---|---|---|---|---|---|---|
| Address No. | 22 | 21 | 20 | 19 | 18 | 17 | ... | 5 | 4 | 3 | 2 | 1 | 0 |
| Sample No. | $S_{-20}$ | $S_{-19}$ | $S_{-18}$ | $S_{-17}$ | $S_{-16}$ | $S_{-15}$ | ... | $S_{-3}$ | $S_{-2}$ | $S_{-1}$ | $S_0$ | $S_{+1}$ | $S_{+2}$ |
| Counter value | 14400 | 14500 | 14600 | 14700 | 14800 | 14900 | ... | 16100 | 16200 | 16300 | 16400 | 16500 | 16600 |
| Voltage A/D value | 200 | 210 | 190 | 220 | 210 | 220 | ... | 4040 | 5300 | 6680 | 8080 | 9680 | 11080 |
| | | | | | | | | | | $\delta_{-3}$ | $\delta_{-2}$ | $\delta_{-1}$ | $\delta_0$ |
| Voltage increment | | 10 | -20 | 30 | -10 | 10 | ... | 1200 | 1260 | 1380 | 1400 | 1600 | 1400 |
| Flag | | 0 | 0 | 0 | 0 | 0 | ... | 0 | 0 | 0 | 0 | 1 | 0 |

MA, m2, m1

F I G. 19
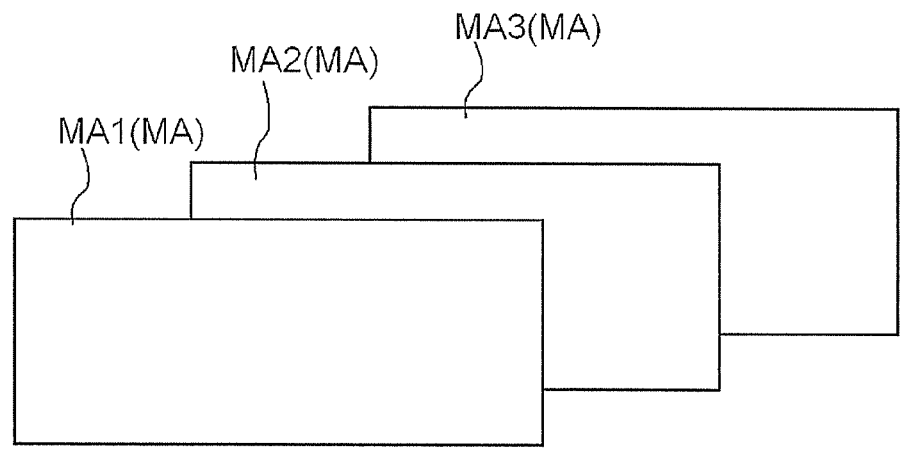
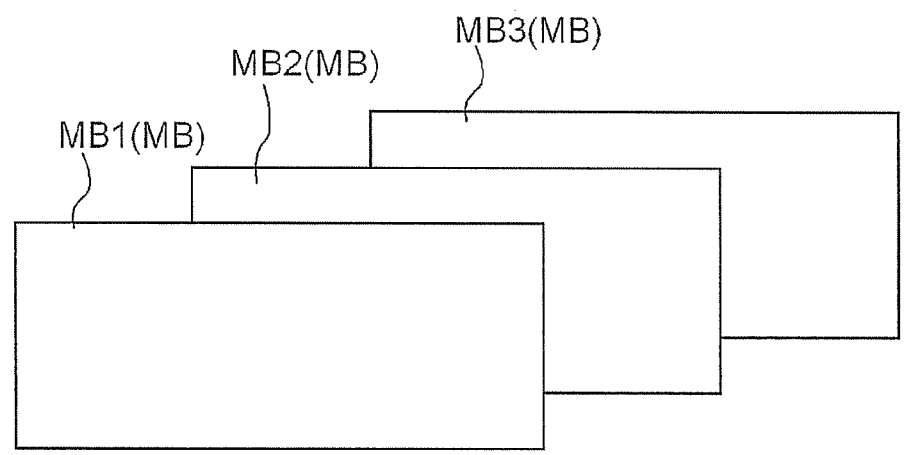
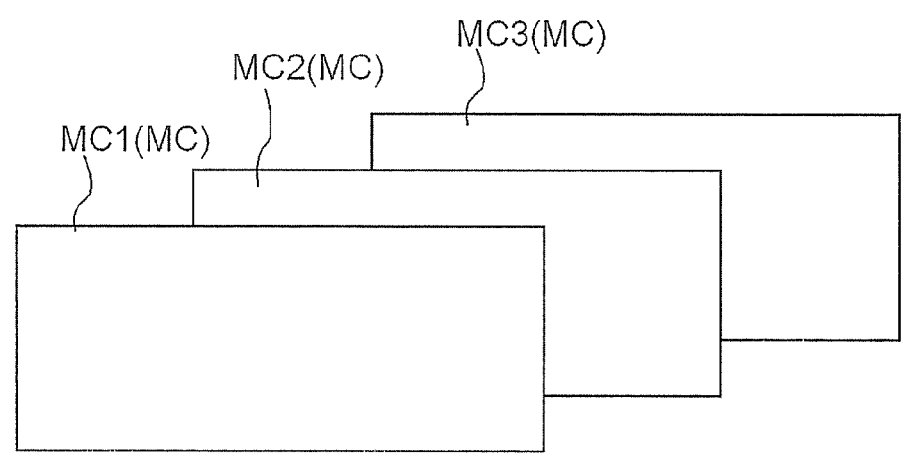

OBJECT DETECTING APPARATUS, OPENING AND CLOSING CONTROL SYSTEM FOR VEHICLE USING OBJECT DETECTING APPARATUS, AND METHOD OF DETECTING UPSTROKE OF ENVELOPE

CROSS REFERENCE TO RELATED APPLICATIONS

This application is based on and claims priority under 35 U.S.C §119 with respect to Japanese Patent Application 2008-084917, filed on Mar. 27, 2008, the entire content of which is incorporated herein by reference.

FIELD OF THE INVENTION

The invention relates to an object detecting apparatus detecting a position of an object based on a reflected wave generated by reflection of a transmitted ultrasonic wave from the object.

BACKGROUND

This type of object detecting apparatus is used for an opening and closing control system for a vehicle, which conducts the obstacle detection and controls the opening and closing body based on the detection result. In JP 2005-69867A (For example, Paragraph 37 to 56 and FIGS. 3 to 5), a technology regarding the object detecting apparatus is disclosed. The technology enables the apparatus to accurately detect a receipt time of a reflected wave even if the amplitude of reflected wave from an object varies. In JP 2005-69867A, an approximate line is obtained by approximating an upstroke of an envelope, using two intersecting points where an envelope obtained from the reflected wave intersects two threshold values, and a time that a value of the approximate line equals 0 volt is obtained. Even if the amplitude of the reflected wave varies and a gradient of the approximation line changes, the position of the zero cross point of the time does not move significantly. Thus, the position of the object is accurately detected.

However, reflected waves from multiple objects or noise components may superpose on the reflected wave to cause a rising portion in the upstroke of the envelope. In such a case, the approximate line is not accurately obtained and thus the time that the value of the approximate line equals 0 volt is not accurately detected. As a result, the detection precision of the object position deteriorates. In the view of the drawback, another technology that obtains the approximate line of the upstroke of the envelope more accurately is disclosed in JP 2007-315892A (For example, Paragraph 20 to 22 and 41 and FIGS. 6 and 10). According to JP 2007-315892A, a peak of the envelope is obtained and the approximate line is obtained by using the peak as the base. For example, the approximate line is obtained by least squares approximation using a voltage value in a predetermined period before the peak. Alternatively, the approximate line is obtained by least squares approximation using a voltage value ranging from 20 to 80 percent of the voltage value at the peak.

The foregoing technologies are excellent technologies for obtaining the accurate receipt time of the reflected wave and detecting the position of the object with high precision. However, as described above, reflected waves from multiple objects or noise components may superpose on the reflected wave, resulting in multiple inflection points in the upstroke of the envelope. In JP 2007-315892A, multiple inflection points may be included in a range which is subject to linear approximation and thus components, which are unnecessary for least squares approximation, are included. Therefore, limitations occur in improvement of the precision of the approximation line, the receipt time, and the objection position.

A need exists for an object detecting apparatus which is not susceptible to the drawback mentioned above.

SUMMARY OF THE INVENTION

According to a first aspect of the present invention, an object detecting apparatus detecting a position of an object based on a reflected wave generated by reflection of a transmitted ultrasonic wave from the object includes a transmitting portion controlling a transmitter to transmit the ultrasonic wave at predetermined transmission timings, a receiving portion receiving the ultrasonic waves, reaching a plurality of receivers located at different positions, as received signals of the plurality of receivers, a detecting portion detecting an envelope of each received signal, and an operation portion detecting a peak of each envelope and obtaining an approximate line with a maximum amount of change of the envelope in a change amount increasing period set to a gradient of the approximate line, provided that the change amount increasing period is defined as a time period in which an amount of change per a predetermined unit time of the envelope, heading to the peak, continues to increase, the operation portion obtaining a time that a voltage value of the approximate line equals a predetermined reference value as a receipt time of the reflected wave and detecting the position of the object based on the receipt time obtained from each envelope.

According to a second aspect of the present invention, an opening and closing control system for a vehicle includes a driving portion driving a vehicle opening and closing body to pivotally open or close and a control portion driving the driving portion to control operation of the opening and closing body, wherein an object detecting apparatus stated in the first aspect of the invention is disposed at the opening and closing body in a manner that a surface of the opening and closing body lies within a detection range, and the control portion drives the driving portion based on a detection result of the object detecting apparatus to control the operation of the opening and closing body.

According to a third aspect of the present invention, a method of detecting an upstroke of an envelope that obtains the envelope of a reflected wave to detect an upstroke starting time of the envelope heading in an increasing direction, provided that a given direction of the envelope is set as the increasing direction, for detecting a position of an object based on the reflected wave generated by reflection of a transmitted ultrasonic wave from the object, the method of detecting the upstroke of the envelope includes the steps of a peak detecting process detecting a peak in the increasing direction of the envelope, an approximate line obtaining process obtaining an approximate line with a maximum amount of change of the envelope in a change amount increasing period set to a gradient of the approximate line, provided that the change amount increasing period is defined as a time period in which an amount of change per a predetermined unit time in the envelope heading to the peak continues to increase, and an upstroke starting time obtaining process obtaining a time that a value of the approximate line equals a predetermined reference value as an upstroke starting time.

BRIEF DESCRIPTION OF THE DRAWINGS

The foregoing and additional features and characteristics of the present invention will become more apparent from the following detailed description considered with reference to the accompanying drawings, wherein:

FIG. 6A is a waveform chart of a received signal obtained from a received wave and FIG. 6B is a waveform chart of the received signal after full-wave rectification;

FIG. 7 is an explanatory diagram showing a principle of peak detection in an envelope;

FIG. 11 is an explanatory diagram showing another example for detecting the inflection point from a ring buffer data;

FIG. 19 is an explanatory diagram schematically showing a configuration example of the ring buffer, the candidate point map, and the averaging map.

DETAILED DESCRIPTION

Figure 1:
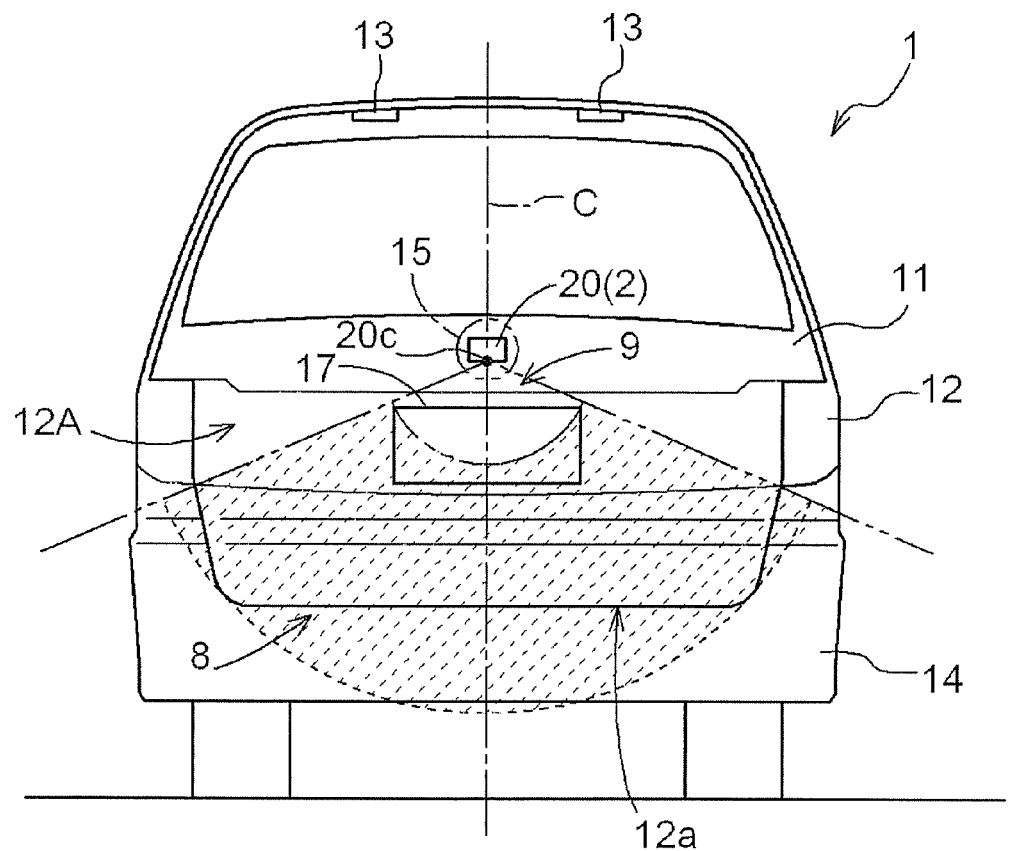
FIG. 1 is a back view of a vehicle, showing a detection range of an object detecting apparatus in an opening and closing control system for a vehicle.
Figure 2:
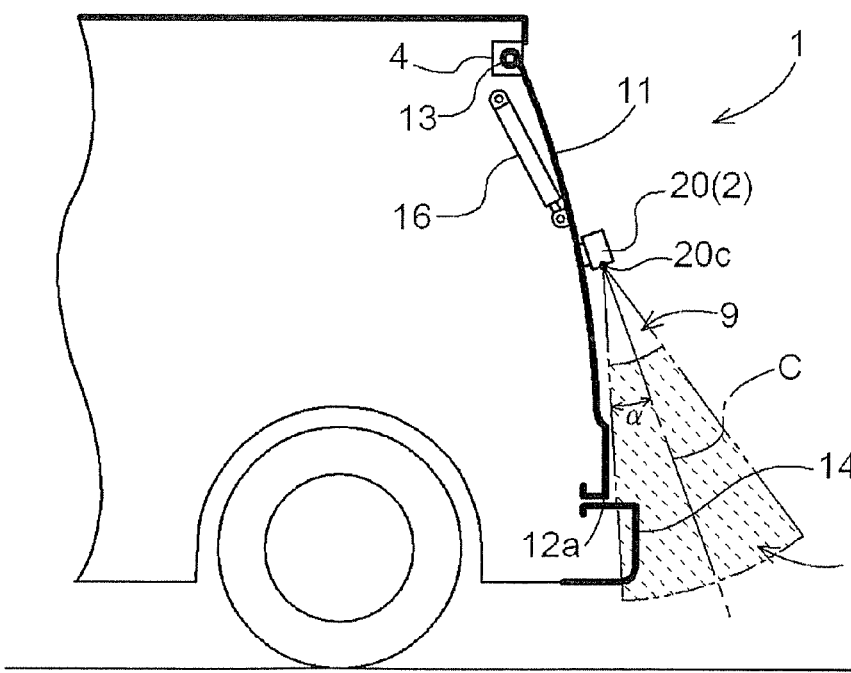
FIG. 2 is a side view of the vehicle, showing the detection range shown in FIG. 1.

Hereinafter, an embodiment of the invention will be described with reference to drawings. In the embodiment, an opening and closing control system, controlling opening and closing operations of a vehicle backdoor as an opening and closing body, will be used as an example. An object detecting apparatus according to the embodiment is incorporated into the opening and closing control system as an ultrasonic wave sensor. FIG. 1 is a back view of a vehicle 1, showing a detection range 8 of an ultrasonic wave sensor 2 (object detecting apparatus) in the opening and closing control system for the vehicle. FIG. 2 is a side view of the vehicle 1, showing the detection range 8 shown in FIG. 1. The backdoor 11 is a pivotal backdoor, which opens and closes in a vertical direction.

The ultrasonic wave is transmitted from the ultrasonic wave sensor 2, and the ultrasonic wave reflects from an object. Then, the ultrasonic wave sensor 2 receives a reflected wave and determines a distance between the ultrasonic wave sensor 2 and the object and a position of the object based on a time period between the transmission and the receipt of the ultrasonic wave. A control portion, i.e. a door ECU (electric control unit) 3, which will be described later, determines that an object is present when the distance and the position are respectively in predetermined ranges. The control portion informs the driver of the presence of the object by a buzzer or a warning sign, or controls a driving unit 4 (door actuator). For example, when the control portion determines that the object is present, the control portion terminates the opening or closing operation of the backdoor 11. As a result, the contact between the backdoor 11 and the object is avoided.

As shown in FIG. 1, a sensor head 20 of the ultrasonic wave sensor 2 is disposed around a position where a vehicle emblem 15 is normally disposed, i.e. a center portion of the vehicle backdoor 11 which pivots around a hinge 13. As shown in FIG. 2, a center axis C of the sensor head 20, which is arranged along a transmitting direction, inclines downward substantially along a surface 12A of the backdoor 11. "The center axis C is arranged substantially along the surface 12A of the backdoor 11" specifically means that an angle between the central axis C and the surface 12A of the backdoor 11 is less than or equal to 45 degrees. The detection range 8 spreads so as to form a fan shape on a plane in which the ultrasonic wave sensor 2 is included and spatially spreads so as to form a frusto-conical shape. The ultrasonic wave sensor 2 has a non detection range 9 around the sensor head 20. In the non detection range 9, the resonance of the transmitted wave is received as the received wave and the ultrasonic wave sensor 2 does not detect the object therein.

If an elevation angle α is set so as to be less than or equal to 60 degrees and more than or equal to 0 degree, a low power ultrasonic wave sensor may be used. Further, if the elevation angle α is set so as to be less than or equal to 45 degrees and more than or equal to 0 degree, the detection sensitivity further improves. The elevation angle α may be set to approximately 90 degrees. In this case, the whole surface 12A of the backdoor 11 may be subject to the detection. Furthermore, in this embodiment, the sensor head 20 is disposed around the emblem 15. However, the sensor head 20 may be disposed around a license plate 17. For example, the sensor head 20 may be disposed around a license plate lamp which lights the license plate 17.

Figure 3:
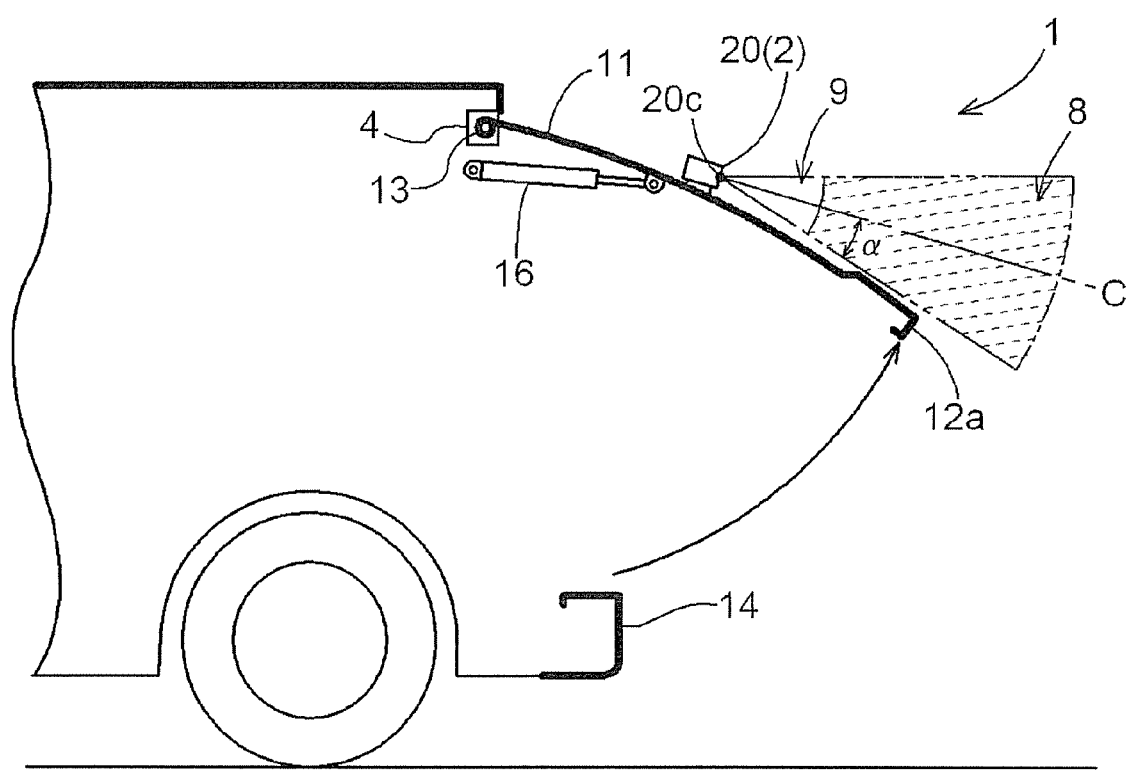
FIG. 3 is a side view of the vehicle, showing the detection range when a backdoor of the vehicle show in FIG. 1 is opened.

Since the sensor head 20 of the ultrasonic wave sensor 2 is disposed at the vehicle backdoor 11, the ultrasonic wave sensor 2 moves with the backdoor 11 when the backdoor 11 is opened or closed. As a result, as shown in FIG. 3, the center axis C of the backdoor 11 is arranged substantially along the surface of the vehicle backdoor 11 on a constant basis, and the detection range 8 moves with the opening backdoor 11. Thus, the object is present in a direction that the backdoor 11 opens, the object is easily detected.

Further, as shown in FIGS. 1 to 3, an end portion 12a (a distal end portion of the surface 12A), which largely moves during the opening or closing operation of the backdoor 11, is included in the detection range 8 of the ultrasonic wave sensor 2. The end portion 12a of the backdoor 11 corresponds to a portion that moves in the fastest speed when opening the backdoor 11. In other words, the end portion 12a corresponds to a position that is most likely to contact with the object.

Hence, the object detection is conducted more assuredly by including the end portion 12a in the detection range 8 of the ultrasonic wave sensor 2.

Figure 4:
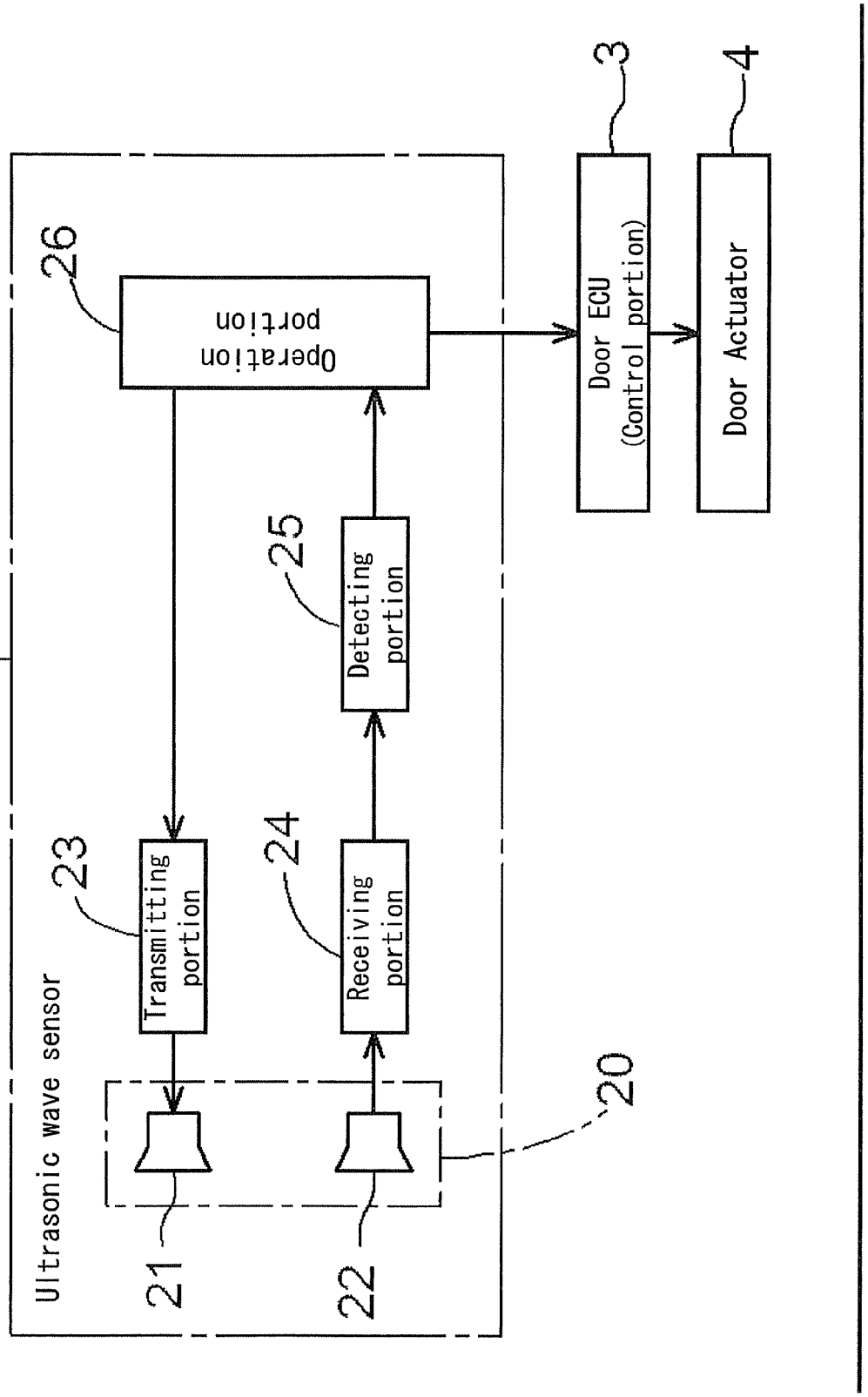
FIG. 4 is a block diagram including a principle block diagram of an ultrasonic wave sensor to show a configuration example of the opening and closing control system for the vehicle.

FIG. 4 is a block diagram including a principle block diagram of the ultrasonic wave sensor 2 to schematically show a configuration example of the opening and closing control system for the vehicle according to the embodiment. As shown in FIG. 4, the opening and closing control system includes the ultrasonic wave sensor 2, the door actuator 4 driving the backdoor 11 to open or close, and the door ECU 3 serving as a control portion. The door ECU 3 drives the door actuator 4 based on the detection result of the ultrasonic wave sensor 2 and controls the backdoor 11 to open or close with the assistance of a gas spring 16.

The ultrasonic wave sensor 2 includes the sensor head 20, a transmitting portion 23, a receiving portion 24, a detecting portion 25, and an operation portion 26, and the sensor head 20 includes a transmitter 21 and a receiver 22. The transmitting portion 23 is a functional part controlling the transmitter 21 to transmit an ultrasonic wave (transmitted wave) at predetermined timings based on a transmission command output from the operation portion 26. The receiving portion 24 is a functional part receiving the ultrasonic wave, which includes a reflected wave generated by reflection of the transmitted wave from an object and reaches the receiver 22, as an electric signal (received signal). The detecting portion 25 is a functional part obtaining an envelope from the received signal and detecting the received wave. The operation portion 26 is a functional part controlling the transmitter 21 to transmit the transmitted wave at the predetermined timings via the transmitting portion 23 and conducting the calculation to determine the presence of the object, the distance to the object, and the position of the object based on the detection result.

The operation portion 26 is mainly made of a microprocessor and a group of logic circuits. In this embodiment, the operation portion 26 is made of a microcomputer including an A/D converter. The transmitting portion 23 has a burst wave generating circuit, an oscillator, a boost circuit, and the like, and oscillates the transmitter 21 in accordance with the transmission command output from the operation portion 26 to transmit the ultrasonic wave. The receiving portion 24 includes an amplifier and a band-pass filter. The amplifier is used for performing the impedance transformation on electrical signals received from the receiver 22 or amplifying the electrical signals, and the band-pass filter is used for filtering the electric signal and allows the signal having a predetermined frequency band to pass. The detecting portion 25 rectifies the output of the band-pass filter and integrates the rectified waveform to obtain the envelope. In the embodiment, the detecting portion 25 is made of an analog circuit including a diode and a capacitor. The output of the detecting portion 25 is input to the A/D converter incorporated in the microcomputer via a sample hold circuit (not shown), which is controlled by the microcomputer forming the operation portion 26, to be converted into the digital signal. However, the method of detection is not limited to this method. For example, the detection may be conducted in the following manner. The A/D conversion is performed on the output of the receiving portion 24, and the detection accompanied by the rectification and the envelope processing may be conducted by digital signal processing.

Figure 5:
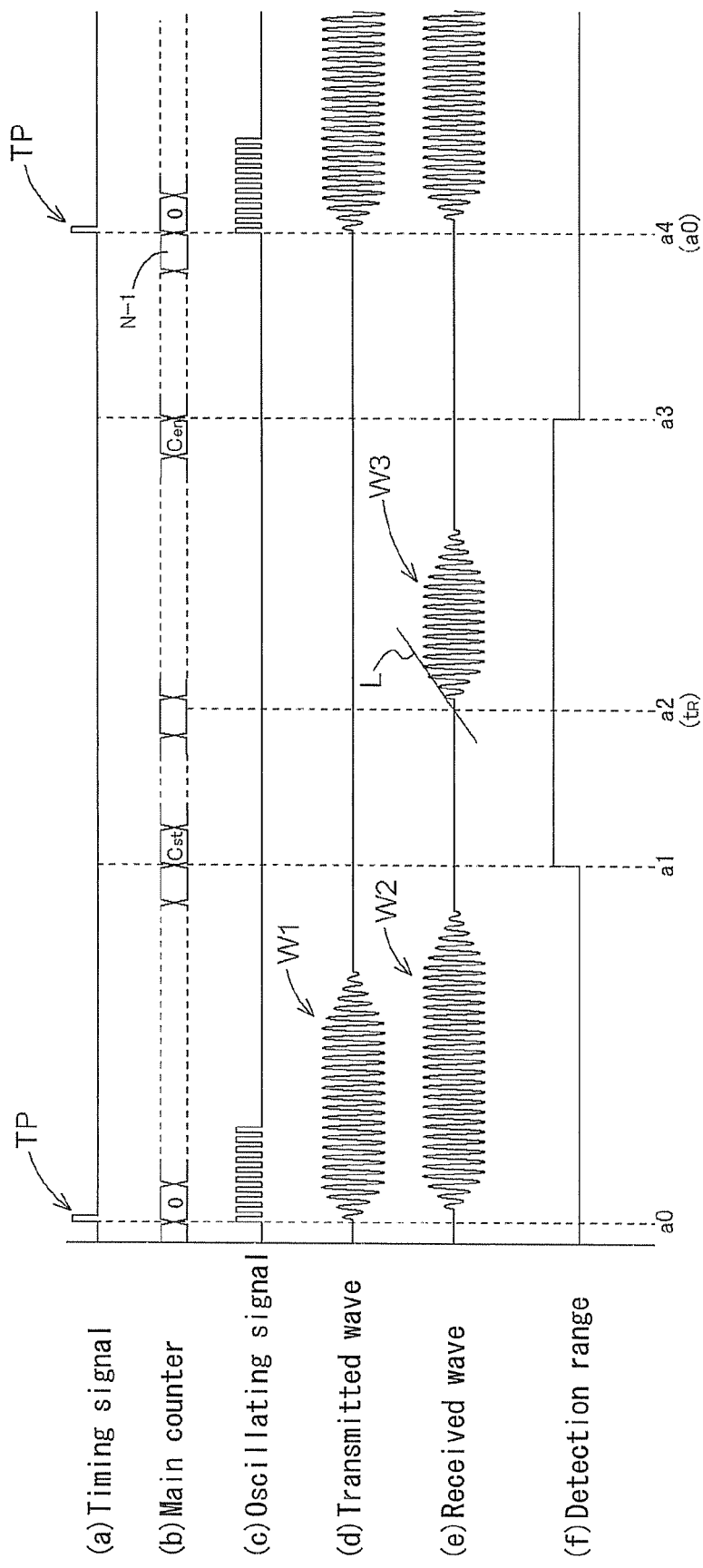
FIG. 5 is a timing chart showing a basic operation of the object detection conducted by the ultrasonic wave sensor.
Figure 17:
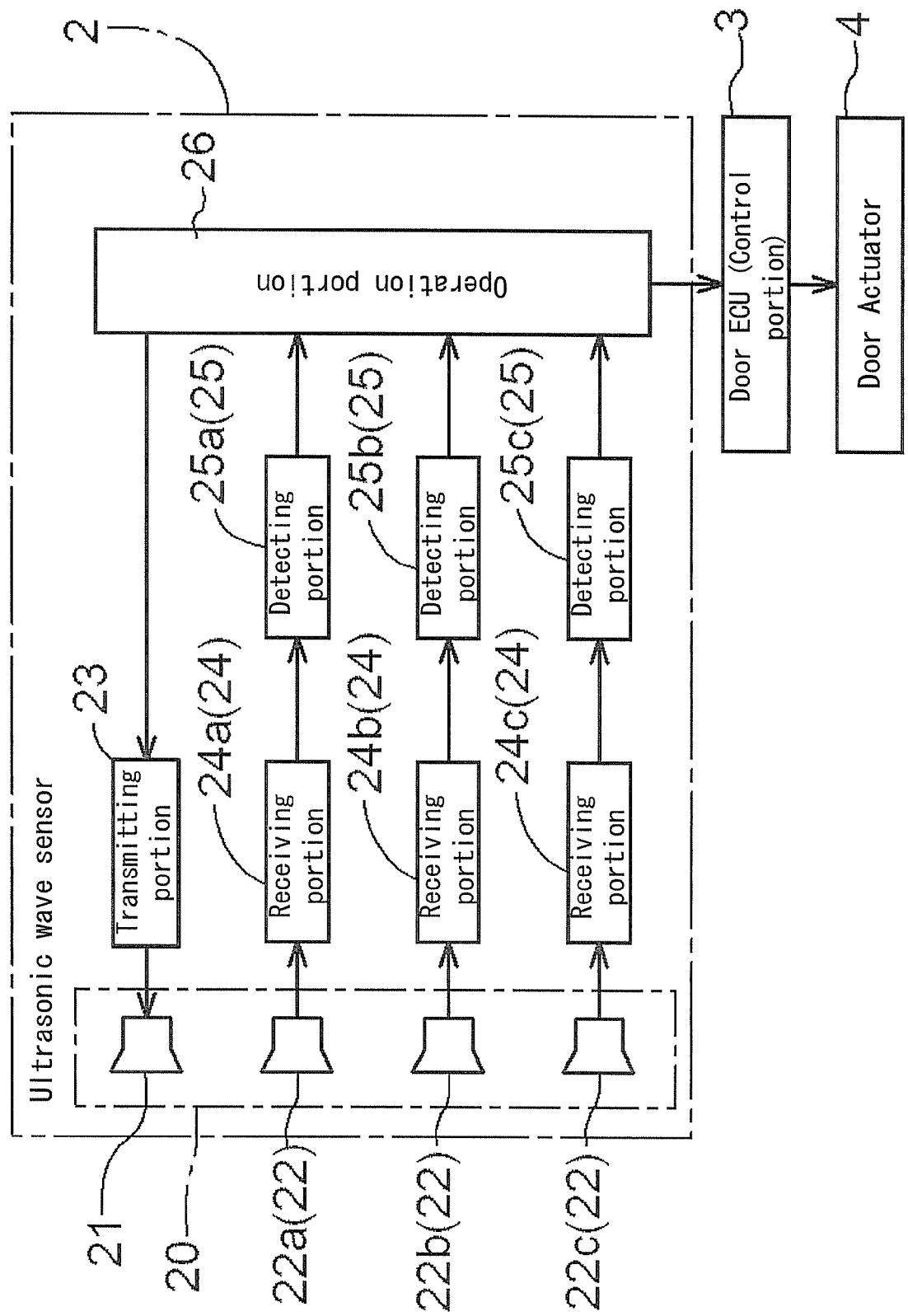
FIG. 17 is a block diagram schematically showing a configuration example of the opening and closing control system for the vehicle.

Hereinafter, the principle of the object detection of the ultrasonic wave sensor 2 and the overview of the opening and closing control system will be described. In the opening and closing control system, the backdoor 11 is controlled to be opened or closed based on the detection result of the ultrasonic wave sensor 2. When detecting the position of the object, a known method, such as trigonometrical survey, is used. Hence, as shown in FIG. 17 which will be described below, the receiver 22, the receiving portion 24, and the detecting portion 25 respectively have multiple function parts. Firstly, the principle of the ultrasonic wave sensor 2 will be described with reference to a simplified block diagram shown in FIG. 4 for ease of explanation. FIG. 5 is a timing chart showing a basic operation of the object detection conducted by the ultrasonic wave sensor 2. FIGS. 6A and 6B are waveform charts used for describing the detection conducted by the detecting portion 25. A function of each function part of the ultrasonic wave sensor 2 will be described in detail with reference to FIGS. 5 and 6.

As shown in (a) of FIG. 5, the operation portion 26 outputs a timing pulse TP, serving as the foregoing transmission command, to the transmitting portion 23 at a Time a0. The timing pulse TP is repeatedly output at given intervals set as the transmission timing, e.g. 10 ms to 100 ms. The operation portion 26 has a main counter which is reset in synchronization with the timing pulse TP as shown (b) of FIG. 5. The main counter counts from 0 to (N−1), i.e. N times, between one timing pulse and the next timing pulse. The value of the main counter indicates an absolute time in each transmission timing. The cycle of one count is set according to a resolution of the ultrasonic wave sensor 2, which is determined by the wavelength of the ultrasonic wave and mounting intervals between the receivers 22 in the sensor head 20, considering a frequency dividing ratio of a clock of the microcomputer.

In the embodiment, for ease of explanation, the interval between the timing pulses TP, serving as the given transmission timing, is set to 100 ms. Further, one count of the main counter is set to 250 ns. Consequently, N=four hundred thousand in each set interval.

When the timing pulse TP is input, the burst wave generating circuit of the transmitting portion 23 generates a burst wave, which is a pulse signal having a set number of pulses, e.g. 10 pulses, and the oscillation circuit generates an oscillating signal having a predetermined frequency, shown in (c) of FIG. 5, based on the burst wave. In the embodiment, the predetermined frequency is set to 40 kHz. The oscillating signal of 40 kHz is input to the boost circuit, made of a coil or the like, to be boosted. Then, the signal is output to the transmitter 21. The transmitter 21 is made of a piezoelectric element or the like including a cover serving as a resonator, and oscillates in response to the boosted oscillating signal of 40 kHz to output the ultrasonic wave serving as a transmitted wave W1 shown in (d) of FIG. 5. As shown (d) of FIG. 5, the amplitude of the output burst wave is larger than that of the oscillating signal because of the resonance of the transmitter 21.

The receiver 22 has a similar configuration as the transmitter 21, and is made of a piezoelectric element or the like including a cover serving as a resonator. Stress is applied to the piezoelectric element from the oscillating cover, and the electrical signal is output by the piezoelectricity effect caused by the piezoelectric element.

The receiver 22 and the transmitter 21 are disposed to be close to each other and serve as the sensor head 20. Hence, as shown in (e) of FIG. 5, the receiver 22, located in the vicinity of the transmitter 21, directly receives the ultrasonic wave transmitted from the transmitter 21. Further, the bumper 14, opposing the end portion 12a of the backdoor 11 and projecting from the vehicle 1 relative to the end portion 12a, is present as a projecting portion in an area which is relatively close to the sensor head 20. Thus, the transmitted wave is reflected by the bumper 14, and the reflected wave is input to the receiver 22.

An example shown in (e) of FIG. 5 simulates a case that the reflected wave from the bumper 14 reaches the receiver 22 during a time period that the resonance of the transmitter 21 still remains. The duration time of the received wave W2 shown in (e) of FIG. 5 is longer than that of the transmitted wave W1 shown in (d) of FIG. 5. The received wave W3 shown in (e) of FIG. 5 simulates the reflected wave reflected from an object other than the bumper 14. In order to distinguish the transmitted wave W1 and the received wave W2 from the reflected wave W3 which is the reflected wave from the object, the transmitted wave W1 and the received wave W2 including the reflected wave from the bumper 14 may be referred to as initial received waves.

The detecting portion 25 and the operation portion 26 do not need to detect the transmission wave W1 and the initial received wave W2 including the reflected wave from the bumper 14 as the reflected wave from the object and do not need to conduct the position detection for these waves. Thus, as shown in (f) of FIG. 5, it is advantageous to set a detection range. In the embodiment, a time period elapsed from a counter value Cst to a counter value Cen, which are counted by the main counter, corresponds to a time period elapsed from Time a1 to Time a3, and the time period is set as the detection range. Further, a mask signal may be output from the operation portion 26 to the receiving portion 24 to cancel the received signal, or a voltage value of the signal may be fixed in a sample hold circuit.

In (e) of FIG. 5, the received wave W3 is the reflected wave from the object. As described above, the detecting portion 25 rectifies the received signal output from the receiving portion 24 and obtains the envelope by integrating the rectified signal. For example, the detecting portion 25 performs the full-wave rectification on the received signal obtained from the received wave W3 shown in FIG. 6A. After the full-wave rectification, the waveform W4 is integrated to obtain the envelope W5. The operation portion 26 approximates an upstroke of the envelope W5 with an approximate line L and obtains Time a2 when a value of the approximate line L (voltage value) equals a given reference value (reference voltage) as an upstroke starting time of the envelope W5. In (e) of FIG. 5, a center of the amplitude of the received wave is set as the reference value. However, the reference value may be set to any value. The upstroke starting time a2 of the envelope W5 corresponds to a receipt time $t_R$ of the embodiment.

In FIG. 6, the full-wave rectification is performed on the received signal. However, the half-wave rectification may be performed. In FIGS. 6A and 6B, the received wave W3 is rectified into the positive voltage and the upstroke of the envelope W5 is obtained, provided that the positive side of the waveform is regarded as an increasing direction. However, the received wave W3 may be rectified into the negative voltage. In this case, the down stroke of the envelope W5 is obtained, provided that the negative side of the waveform is regarded as the increasing direction. Obtaining the upstroke and obtaining the down stroke are equivalent in that the approximate line is obtained with respect to a direction that the amplitude of the received wave W3 increases. The procedure that the operation portion 26 obtains the approximate line L and the receipt time $t_R$ will be described in detail below.

The operation portion 26 calculates a distance between the sensor head 20 and the object based on a time difference between Time a0, when the timing pulse TP is output, and the receipt time $t_R$ (a2). More specifically, the calculation is conducted based on the counter value of the main counter. The time difference between Time a0 and Time a2 corresponds to a time period that an ultrasonic wave of approximately 340 m/s makes a round-trip between the sensor head 20 and the object. Hence, the distance is obtained by calculating the product of the time period for one-way trip, i.e. half the time period for the round-trip, and the sonic speed. The operation portion 26 determines the presence of the object by the receipt time $t_R$ and calculates the distance between the sensor head 20 and the object. If multiple receivers 22 are provided at different positions, the position of the object, i.e. a three-dimensional coordinate, is obtained.

The result of the calculation, conducted by the operation portion 26, is output to the door ECU 3. When the object is detected in the vicinity of the backdoor 11, the door ECU 3 terminates the operation of the door actuator 4. Thus, the opening door is stopped before the backdoor 11 comes in contact with the object.

Hereinafter, a method that the operation portion 26 obtains the receipt time $t_R$ will be described in detail. As described above, the ultrasonic wave sensor 2 is a type of object detecting apparatus, which detects the position of the object based on the reflected wave generated by the reflection of the transmitted ultrasonic wave from an object. The operation portion 26 of the ultrasonic wave sensor 2 obtains the receipt time $t_R$ by performing multiple processes. Specifically, the operation portion 26 detects a peak of the envelope W5 in a peak detecting process, obtains the approximate line L in an approximate line obtaining process, and obtains the time when the approximate line L intersects with the reference voltage in a receipt time obtaining process (upstroke starting time obtaining process) to obtain the receipt time $t_R$.

[Peak Detecting Process]

Firstly, the peak detecting process will be described. FIG. 7 is an explanatory diagram showing a principle for detecting the peak from the envelope W5. The operation portion 26 detects the peak when the voltage value increases for a predetermined increasing time and then decreases, provided that a positive side of the envelope W5 is set to a predetermined direction of the voltage value of the envelope W5. Hereinafter, in the embodiment, the received signal is rectified into the positive voltage. However, as described above, the outcome is similar even when the received signal is rectified into the negative voltage. Hence, the peak is not limited to a peak in the positive side, and is defined as a maximum value in the direction that the amplitude of the received signal increases. Further, in the example used in the embodiment, the envelope W5 is rectified into the positive voltage. Thus, when the envelope W5 heads to the peak, a term "upstroke" is used to describe the movement. However, in case that the envelope W5 is rectified into the negative voltage, when the envelope W5 heads to the peak, a term "down stroke" is used to described the movement, and "upstroke" is equivalent to "down stroke".

As shown in FIG. 7, the operation portion 26 obtains the voltage value of the envelope W5 at a sampling time which is set every predetermined sampling period TS. The sampling period TS and the sampling time are represented by counter values of the main counter. In the embodiment, the sampling period TS is equivalent to the counter value 100, and the sampling time corresponds to the value obtained by adding 100 to last two digits. As just described, the counter value 1 is equal to 250 ns and the sampling period TS is equal to 25 μs.

In FIG. 7, each white circle on the envelope W5 represents a sample taken at the sampling time. For example, a sample $S_0$ at time $t_P$ in FIG. 7 is a peak P of the envelope W5. As described above, in the embodiment, the received signal is converted from an analog signal to a digital signal. Specifically, when the voltage value is 0 to 5V, the signal is converted from the analog signal to the digital signal by an A/D converter having 16 bits resolution, and the voltage value after the A/D conversion is referred to as a voltage A/D value. The voltage A/D value 1 is equal to approximately 76 μV. The voltage A/D value of the sample $S_0$, obtained from the received signal shown in FIG. 7, is 19740 (approximately 1.5V), and the peak time $t_P$ is 18100 in the counter value (approximately 4.5 ms from the timing pulse TP).

The operation portion 26 detects the peak P when the voltage value of the envelope W5, obtained every the sampling period TS, increases at least two consecutive times and then decreases as shown in FIG. 7. In FIG. 7, the voltage values of the samples $S_{-2}$, $S_{-1}$, $S_0$ establish a relation expressed by the following expression.

$$S_{-2} < S_{-1} < S_0$$

Further, $S_0$ and $S_{+1}$ establish a relation expressed by the following expression.

$$S_0 > S_{+1}$$

Accordingly, the voltage value increases two consecutive times from $S_{-2}$ to $S_{-1}$ and from $S_{-1}$ to $S_0$ and then the voltage value decreases from $S_0$ to $S_{+1}$. Thus, the sampling time $t_P$ of the sample $S_0$ is regarded as the peak time, and the voltage A/D value (voltage value) at the peak time $t_P$ is regarded as the peak voltage value $V_P$.

The operation portion 26 obtains the approximate line L based on the voltage values of 21 samples, i.e. $S_0$ and $S_{-1}$ to $S_{-20}$, which are respectively taken at the sampling times within a predetermined period T1 before the peak time $t_P$. The operation portion 26 has a ring buffer MA shown in an upper section of FIG. 8. The voltage A/D values and the counter values of 23 samples, i.e. $S_0$, $S_{-1}$ to $S_{-20}$, and $S_{+1}$, and $S_{+2}$, which are taken at the sampling times during a temporary storage period TW shown in FIG. 7, are stored in the ring buffer MA. The samples $S_{+1}$ and $S_{+2}$ are taken at the sampling times within a predetermined period T2 after the peak time $t_P$, when the envelope W5 decreases after peaking at the peak P. The values of the samples are stored to detect the peak P clearly.

Figure 8:
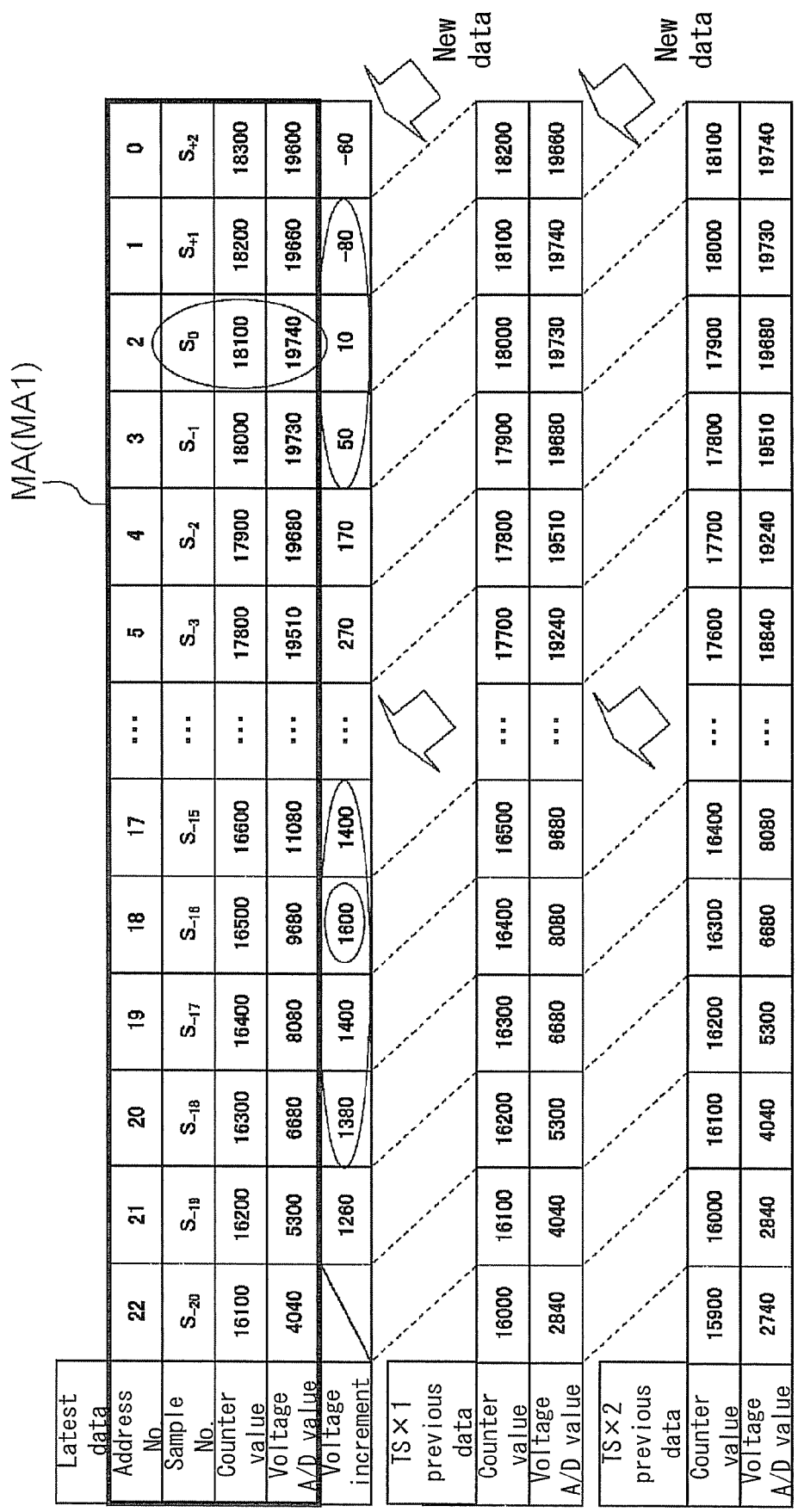
FIG. 8 is an explanatory diagram of a ring buffer.

A middle section of FIG. 8 shows the voltage A/D values and the counter values of 23 samples, which are stored in the ring buffer MA at one previous sampling period TS from the sampling period TS of the data stated in the upper section. A lower section of FIG. 8 shows the voltage A/D values and the counter values of 23 samples, which are stored in the ring buffer MA at one previous sampling period TS from the sampling period TS of the data stated in the middle section. In other words, the 23 samples are stored in the ring buffer MA at two previous sampling periods TS from the sampling period TS of the data stated in the upper section. Every time a new sample data is obtained, the ring buffer MA deletes the oldest sample data to store a dataset for the 23 samples, i.e. $S_0$, $S_{-1}$ to $S_{-20}$, $S_{+1}$ and $S_{+2}$. The ring buffer MA is made of a memory or a register. In case that the ring buffer is made of a register, it is advantageous to employ a shift register structure.

The operation portion 26 may detect the peak P by checking the whole dataset stored in the ring buffer MA or by checking the voltage values of the samples, which are sequentially obtained, for the decrease after the two consecutive increases. In case that the peak P is detected by checking the whole dataset, the operation portion 26 calculates voltage increments (difference) between adjacent samples as shown in the upper section of FIG. 8. Namely, the increment of the voltage value (difference) from that of the sample taken at one previous sampling period TS is calculated. If the voltage increment are arranged in an order such that a positive value→a positive values→a negative value, the voltage value immediately before the decrease is detected as the peak P.

In case that the peak P is detected by checking the voltage values of the samples which are sequentially obtained, the operation portion 26 calculates the voltage increments only for three samples, for example, $S_{-1}$, $S_0$, and $S_{+1}$, constantly. If the results are arranged in the order such that a positive values→a positive values→a negative value, the operation portion 26 sets the dataset of the ring buffer MA as a dataset in which the receipt time $t_R$ is to be detected and regards the sample $S_0$ in the dataset as the peak P. As just described, various methods are applicable for detecting the peak P.

[Approximate Line Obtaining Process]

As described above, after the peak P of the envelope W5 is detected and the dataset, in which the receipt time $t_R$ is to be detected, is determined, the operation portion 26 obtains the approximate line L. At that time, a maximum amount of change in a change amount increasing period is set to a gradient of the approximate line L, provided that the change amount increasing period is defined as a time period that an amount of change per a predetermined unit time in the envelope 5 heading to the peak increases. Specifically, the operation portion 26 calculates differences between the voltage values (voltage increments) of the samples which are taken at two consecutive sampling times. If the difference increases at least two consecutive times and then decreases, the period up to the decrease is set as the change amount increasing period. Thus, the change amount increasing period is defined as a period up to an inflection point where the envelope 5, increasing in a manner that approaches a straight line arranged in parallel to an axis of the voltage, inflects. The operation portion 26 obtains a difference between the voltage values before the decrease, i.e. a difference immediately before the inflection point, as the maximum amount of change in the change amount increasing period, and the maximum amount of change is set as the gradient of the approximate line L. Namely, the operation portion 26 obtains the approximate line L while setting a derivative value immediately before the inflection point as the gradient of the approximate line L. Hereinafter, the process will be described in detail.

Figure 9:
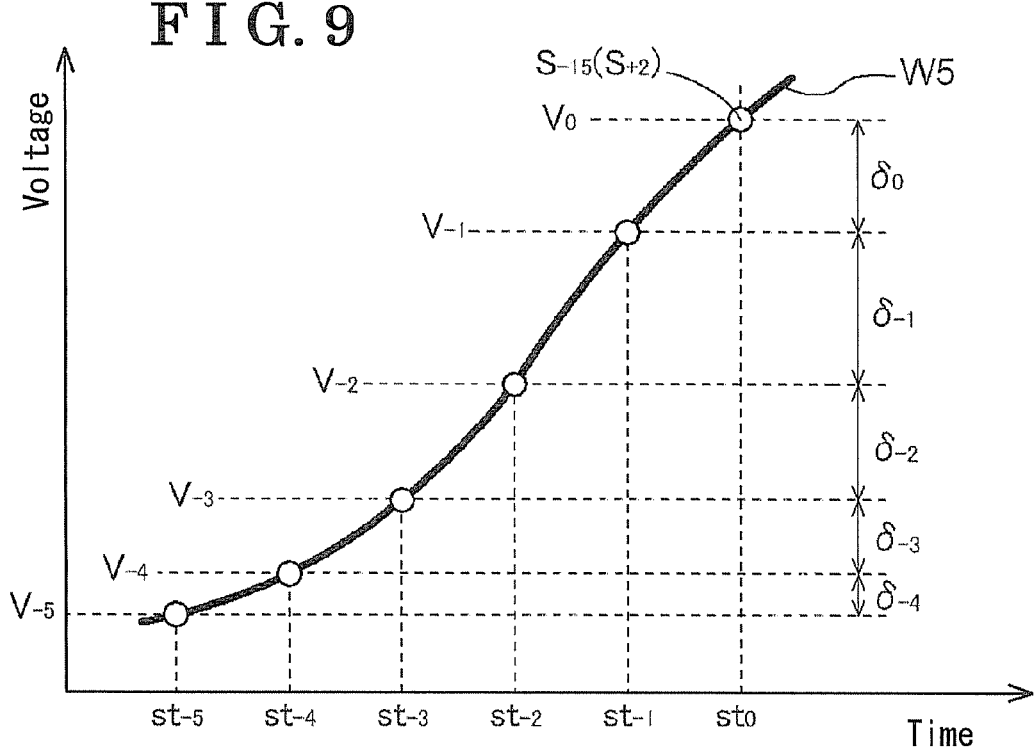
FIG. 9 is an explanatory diagram showing a principle for detecting an inflection point.
Figure 10:
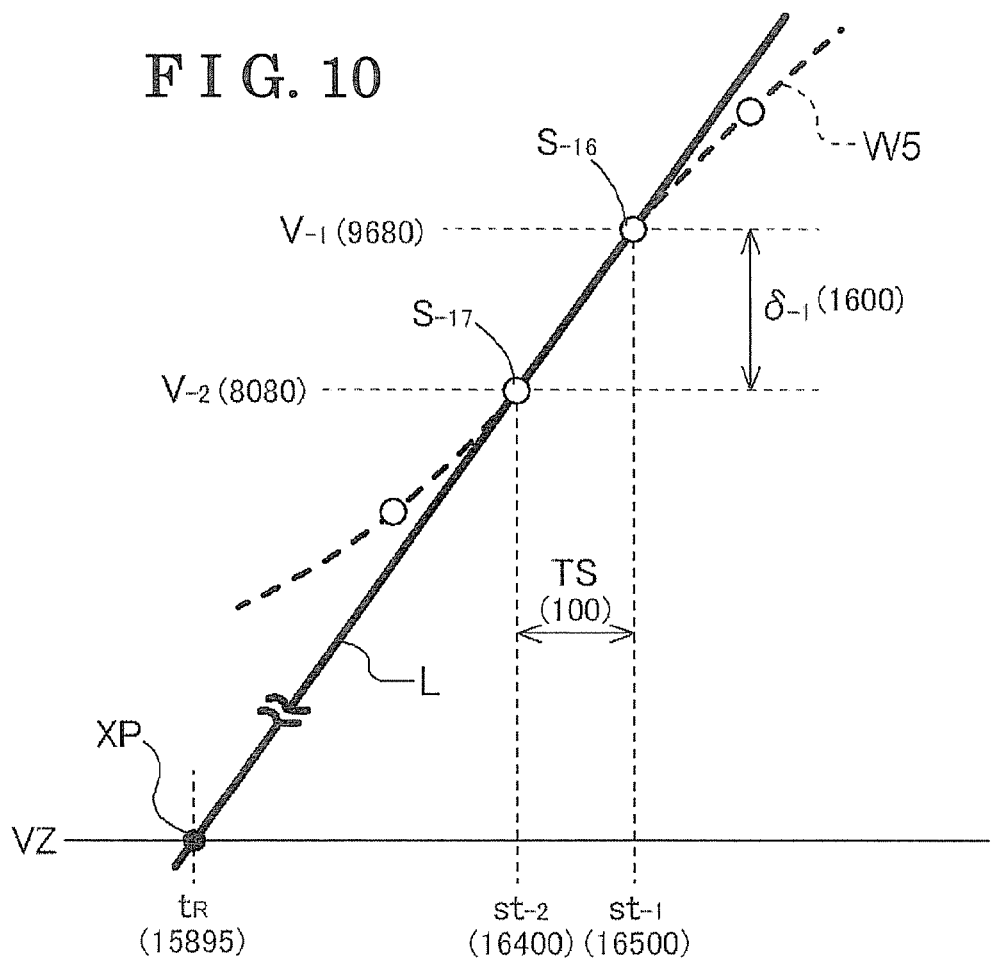
FIG. 10 is an explanatory diagram showing a principle for obtaining an approximate line and a receipt time.

FIG. 9 is an explanatory diagram showing the principle for detecting the inflection point of the envelope W5. FIG. 10 is an explanatory diagram for obtaining the approximate line L and the receipt time $t_R$. In FIG. 9, the sampling time $st_0$ indicates the latest sampling time, and $St_{-1}$ to $St_{-5}$ indicates the sampling times, respectively going back from the left adjacent sampling time by one sampling period TS. The voltage values of the samples, taken at the sampling times $st_{-5}$ to $st_0$, are respectively labeled as $V_{-5}$ to $V_0$. A difference between the voltage values $V_{-5}$ and $V_{-4}$, a difference between the voltage values $V_{-4}$ and $V_{-3}$, a difference between the voltage values $V_{-3}$ and $V_{-2}$, a difference between the voltage values $V_{-2}$ and $V_{-1}$, and a difference between the voltage values $V_{-1}$ and $V_0$ are respectively set as $\delta_{-4}$, $\delta_{-3}$, $\delta_{-2}$, $\delta_{-1}$, and $\delta_0$.

The differences δ ($\delta_{-4}$ to $\delta_{-1}$), corresponding to the amount of change per unit time (the sampling period TS), increases over time from $st_{-5}$ to $st_{-1}$. Hence, the period from $st_{-5}$ to $st_{-1}$ corresponds to the change amount increasing period. Since the maximum amount of change in this period is the difference $\delta_{-1}$, the difference $\delta_{-1}$ is obtained as the gradient of the approximate line L. Then, the approximate line L is obtained as shown in FIG. 10.

As shown in FIG. 9, the difference δ increases at least two consecutive times from the difference $\delta_{-3}$ to the difference $\delta_{-2}$ and from difference $\delta_{-2}$ to the difference $\delta_{-1}$ and then decreases from difference $\delta_{-1}$ to the difference $\delta_0$. In this case, the difference $\delta_{-1}$ before the decrease is regarded as the maximum amount of change in the change amount increasing period. Hereinafter, the process will be described by assigning specific values. Referring back to FIG. 8, the sample taken at the sampling time $st_0$ of FIG. 9 corresponds to the sample $S_{-15}$ of FIG. 8. Since the voltage increment of FIG. 8 corresponds to the difference δ of FIG. 9, the differences $δ_0$, $δ_{-1}$, $δ_{-2}$, $δ_{-3}$, and $δ_{-4}$ respectively correspond to the voltage increments 1400, 1600, 1400, 1380, and 1260 of FIG. 8. As shown in FIG. 8, the difference δ increases at least two consecutive times from the difference $δ_{-3}$ (1380) to the difference $δ_{-2}$ (1400) and from difference $δ_{-2}$ (1400) to the difference $δ_{-1}$ (1600), and then decreases from difference $δ_{-1}$ (1600) to the difference $δ_0$ (1400). In this case, the difference $δ_{-2}$ (1600) before the decrease is regarded as the maximum amount of change in the change amount increasing period. As shown in FIG. 10, the gradient can be obtained by using the voltage A/D value and the counter value used in the calculation of the operation portion 26. In this case, the result of the calculations is 16=1600/100.

In the foregoing description, the sampling period TS is set as the unit time for obtaining the amount of change. However, the unit time is not limited to the sampling period TS. For example, the unit time may be set to a time period doubling the sampling period TS. In this case, the peak may be detected by calculating the difference of the voltage values and checking the differences for increasing or decreasing every two sampling times. Alternatively, the peak may be detected by obtaining the difference between the current voltage value and the two previous voltage value and checking the difference for increasing or decreasing every sampling time. Further, the peak may be detected by performing moving average on the difference between the voltage values obtained at the sampling periods TS. As just described, the unit time for obtaining the amount of change is not limited to the one described in the embodiment.

[Receipt Time Obtaining Process (Upstroke Staring Time Obtaining Process)]

FIG. 10 shows the principle for obtaining the approximate line L and the receipt time $t_R$, and the values from the dataset stored in the buffer memory MA shown in FIG. 8 are assigned in FIG. 10. The method for obtaining the receipt time $t_R$ from the approximate line L will be described with reference to FIG. 10. As described above, the gradient of the approximate line L is 16. Assuming that the voltage is v, the time is t, and the intercept is A. Then, the approximate line L is expressed by the expression (1).

$$v=16t+A \qquad (1)$$

The approximate linen L passes through a point representing the sample $S_{-16}$ (t=16500, v=9680) and a point representing the sample $S_{-17}$ (t=16400, v=8080). As shown in the below expression (2), if the values of either of the points are assigned in the expression (1), the intercept A is obtained as shown in the below expression (3).

$$9680=16\times6500+A \qquad (2)$$

$$A=-254320 \qquad (3)$$

The operation portion 26 obtains a time that the voltage value of the approximate line L equals a predetermined reference voltage VZ as the receipt time $t_R$. Specifically, as shown in FIG. 10, a time of a cross-point XP, where the approximate line L intersects the predetermined reference voltage VZ arranged in parallel to the time axis, is obtained as the receipt time $t_R$. The reference voltage VZ may be set to any value. However, it is desirable to set the cross-point to 0 for ease of calculation. Namely, it is desirable that the cross point XP is a zero cross point between the approximate line L and the voltage 0. The value of the intercept A obtained by the expression (3) is assigned to the expression (1) to obtain the value t when the voltage v=0. Consequently, as shown in the below expression (4), the receipt time $t_R$ corresponds to the counter value 15895.

$$t=254320/16=15895 \qquad (3)$$

In the description of the peak detection process, it is stated that the operation portion 26 may detect the peak P by checking the whole dataset stored in the ring buffer MA or by checking the voltage values of the samples which are sequentially obtained for the decrease after the two consecutive increases. The same is true for obtaining the approximate line L. In the foregoing example, the inflection point exists at the sample $S_{-16}$. In this case, setting aside the detection for the presence of the peak, it is possible to obtain the approximate line L as long as the samples up to the sample $_{-15}$ are taken. In other words, as shown in parentheses of FIG. 9 and FIG. 11, it is possible to detect the inflection point at the point that the sample $S_{-15}$ corresponds to the sample $S_{+2}$.

As an embodiment, a flag storage area m1 and a voltage increment storage area m2 are provided in the ring buffer MA. If the results of the consecutive calculations are stored in these regions, and the approximate line L may be obtained when the conditions of the inflection points are satisfied in the dataset of the ring buffer MA. Similarly, if the data storage region is provided and the results of the consecutive calculations are stored in the region, the receipt time $t_R$ may be obtained once the approximate line L is obtained. However, if the peak P does not exist in the dataset, the calculations, conducted for obtaining the approximate line L and the receipt time $t_R$, become useless. Thus, it would be more desirable to obtain the approximate line L, and the receipt time $t_R$ after the peak P is detected in the dataset. As just described, the calculations for obtaining the approximate line L and the receipt time $t_R$ may be appropriately selected depending on the embodiment.

Figure 12:
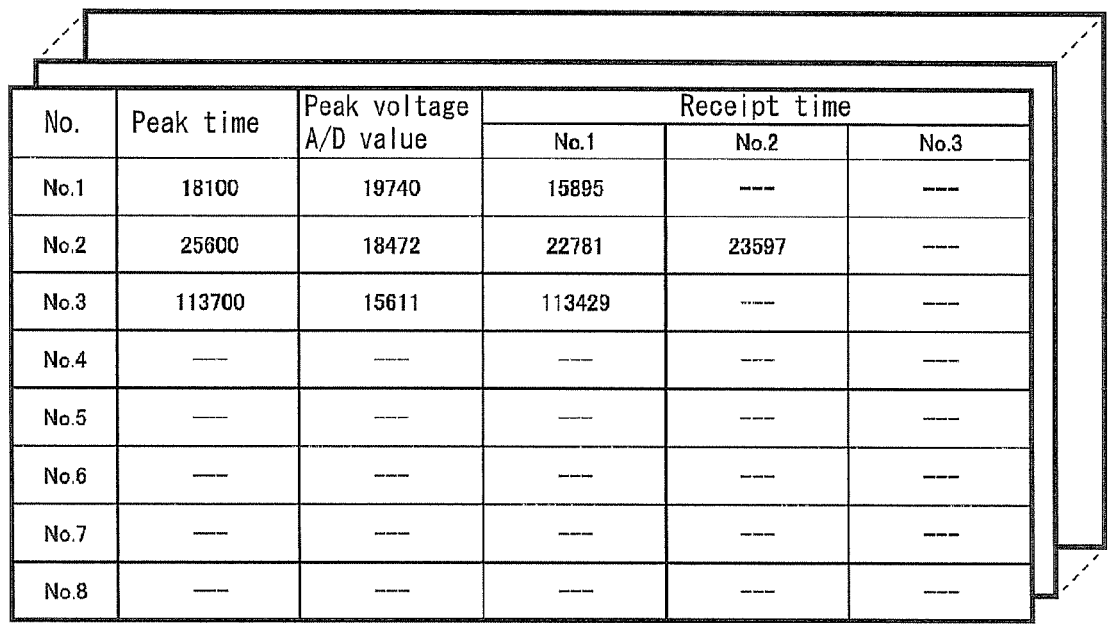
FIG. 12 is an address map schematically showing an example of a candidate point map.
Figure 13:
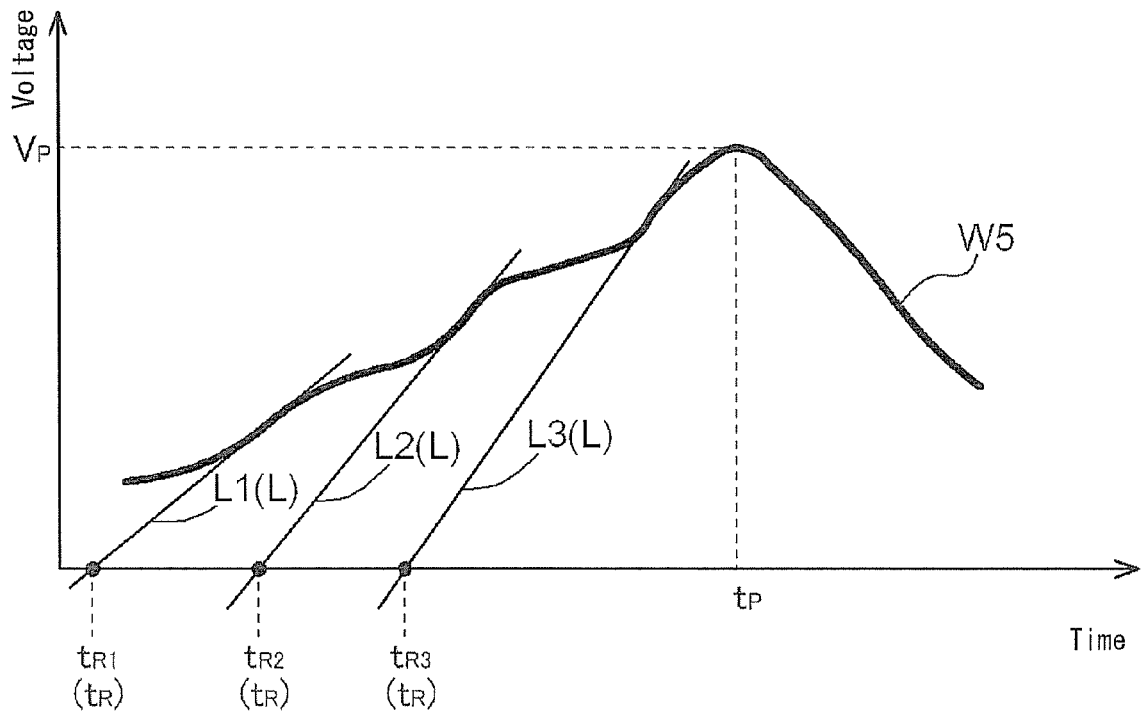
FIG. 13 is a waveform chart schematically showing an example of an envelope in which multiple inflection points exist and multiple receipt times are detected.
Figure 14:
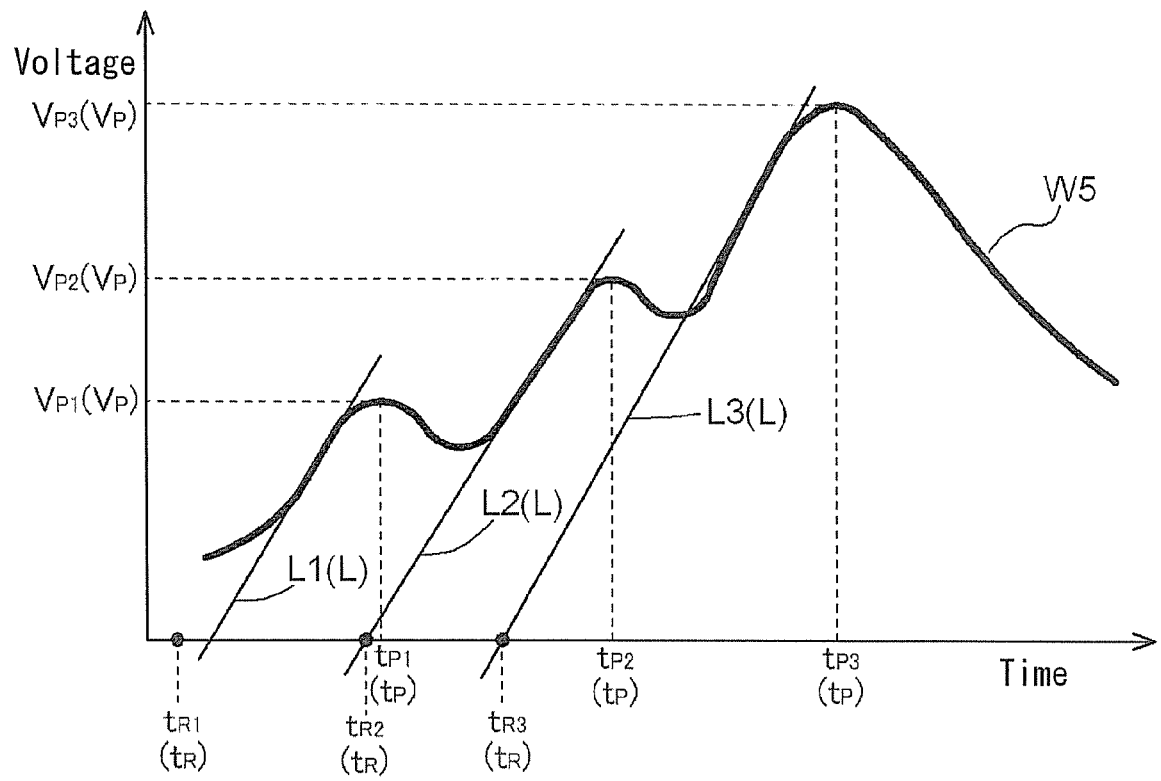
FIG. 14 is a waveform chart schematically showing an example of an envelope in which multiple peaks exist and multiple receipt times are detected.
Figure 15:
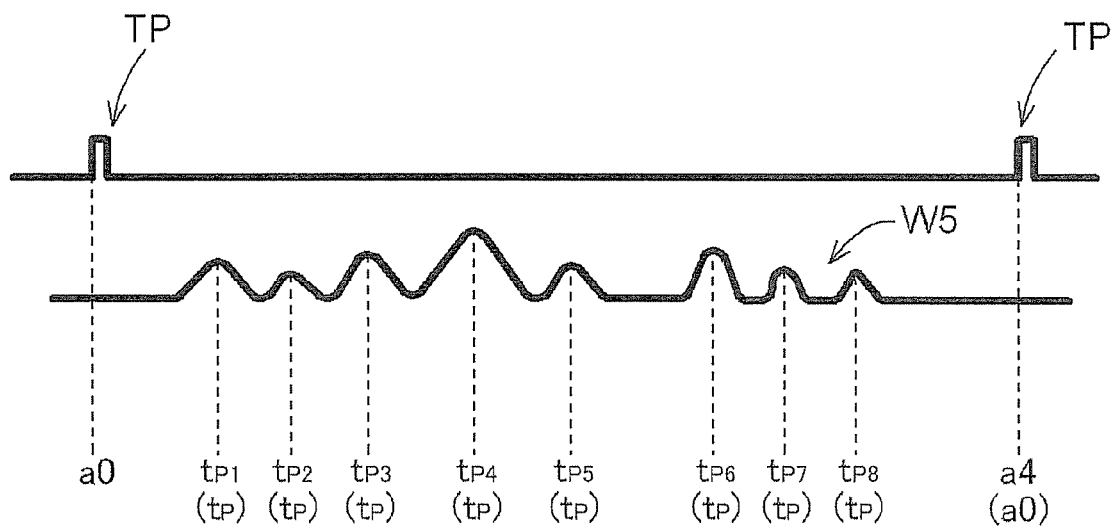
FIG. 15 is a waveform chart schematically showing an example of receiving multiple received waves at one transmission timing.

The obtain receipt time $t_R$ is stored in a candidate point map MB as shown in FIG. 12. The number of the envelope, the peak time $t_P$, the peak voltage A/D value $V_P$, and the receipt time $t_R$ are stored in the candidate point map MB. As for the information stored in the candidate point map MB, the complementary description will be provided with reference to FIGS. 13 to 15. FIG. 13 is a waveform chart schematically showing one example of the envelope W5 in which multiple inflection points exist and multiple receipt times $t_R$ are detected. FIG. 14 is a waveform chart schematically showing one example of the envelope W5 in which multiple peaks exist and multiple receipt time $t_R$ are detected. FIG. 15 is a waveform chart schematically showing one example for receiving multiple received waves W3 at one transmission timing (timing pulse TP).

In the description of the embodiment, for ease of explanation, a case, in which one inflection point exists in the envelope W5 increasing toward the peak P, is used as an example. However, in reality, the reflected waves from multiple objects, or noise components may superpose on the envelope 5. In the case, there would be multiple inflection points in the envelope W5, in which the voltage value increases toward the peak P. FIG. 13 is a waveform chart simulating the envelope W5 having the multiple inflection points. In such a case, multiple approximate lines L1, L2, and L3 may be obtained as the approximate line L by performing the foregoing approximate line obtaining process. Specifically, when the difference between the voltage values of the samples, which are taken at two consecutive sampling times, increases at least two consecutive times and then decreases, the difference δ before the decrease is set to the gradient of the approximate line L. Thus, the multiple approximate lines L are obtained in a short period. Since the multiple approximate lines L are obtained, the multiple receipt times $t_{R1}$, $t_{R2}$, and $t_{R3}$ are obtained as the receipt time $t_R$ so as to correspond to the multiple approximate lines L1, L2, and L3.

As shown in FIG. 12, the candidate point map MB is configured so as to store the peak time $t_P$, the peak voltage A/D value $V_P$, and three receipt times $t_R$ for one peak P. Hence, all of the receipt times $t_{R1}$, $t_{R2}$, and $t_{R3}$ are stored in the candidate point map MB. The number of the receipt times $t_R$ that are detected and stored for one peak is not limited to three. The number may be increased or decreased according to the system configuration.

Further, as shown in FIG. 14, when the reflected waves from multiple objects or the noise components superpose on the envelope W5, the envelope W5 may have multiple peaks P. In such a case, the peak P represents a "mountain" exhibiting the increase before the decrease, not the maximum value. As described above, in the peak detecting process of the embodiment, the peak P is detected when the voltage value of the envelope 5, measured at each predetermined sampling period TS, increases at least two consecutive times and then decreases. Thus, the multiple peaks P are obtained in a short period. Then, the approximate lines L are obtained for the respective "mountains" to obtain the multiple receipt times $t_{R1}$, $t_{R2}$, and $t_{R3}$.

FIG. 14 is a waveform chart simulating the envelope W5 which has the multiple "mountains". In this example, the peak times $t_{P1}$, $t_{P2}$, and $t_{P3}$ and the peak voltage A/D values $V_{P1}$, $V_{P2}$, and $V_{P3}$ are obtained for the three mountains, and the receipt times $t_{R1}$, $t_{R2}$, and $t_{R3}$ are obtained so as to correspond to each peak P. Each peak may have the three receipt times $t_R$.

Furthermore, as described above, the receiving portion may receive the reflected waves from multiple objects at one transmission timing in which one timing pulse TP is output. FIG. 15 simulates an example that eight received waves are received at one transmission timing. In this case, the peak times $t_{P1}$, $t_{P2}$, $t_{P3}$, $t_{P4}$, $t_{P5}$, $t_{P6}$, $t_{P7}$, and $t_{P8}$ and the peak voltage A/D values $V_{P1}$, $V_{P2}$, $V_{P3}$, $V_{P4}$, $V_{P5}$, $V_{P6}$, $V_{P7}$, and $V_{P8}$ are obtained for eight mountains. As shown in FIG. 12, the candidate point map MB is configured so as to store the information for eight peaks P labeled as No. 1 to No. 8. FIG. 12 shows a case that three peaks P labeled as No. 1 to No. 3 are detected at the transmission of one timing pulse TP. In FIG. 12, the two receipt times $t_R$ are detected for the peak No. 2. The number of peaks P that are detected and stored at one transmission timing are not limited to eight, and may be changed according to the system configuration.

The operation portion 26 has multiple candidate point maps MB to store the information of the candidate points obtained at multiple transmission timings (timing pulses TP). Here, the candidate point means a position of an object to be detected, and the information of the candidate point includes the peak time $t_P$, the peak voltage $V_P$, and the receipt time $t_R$. The candidate point map MB is formed by a ring structure. Every time new information of the candidate point is obtained, the oldest information is overwritten with the latest information. For example, the candidate point map MB may store the candidate points detected at ten transmission timings. In this case, the candidate points detected at the ten transmission timings from the latest transmission timing $TP_0$ up to the nine previous transmission timing $TP_{-9}$ are stored. The number of the information of the candidate point obtained at each transmission timing and stored is not limited to ten, and may be changed according to the system configuration.

Figure 16:
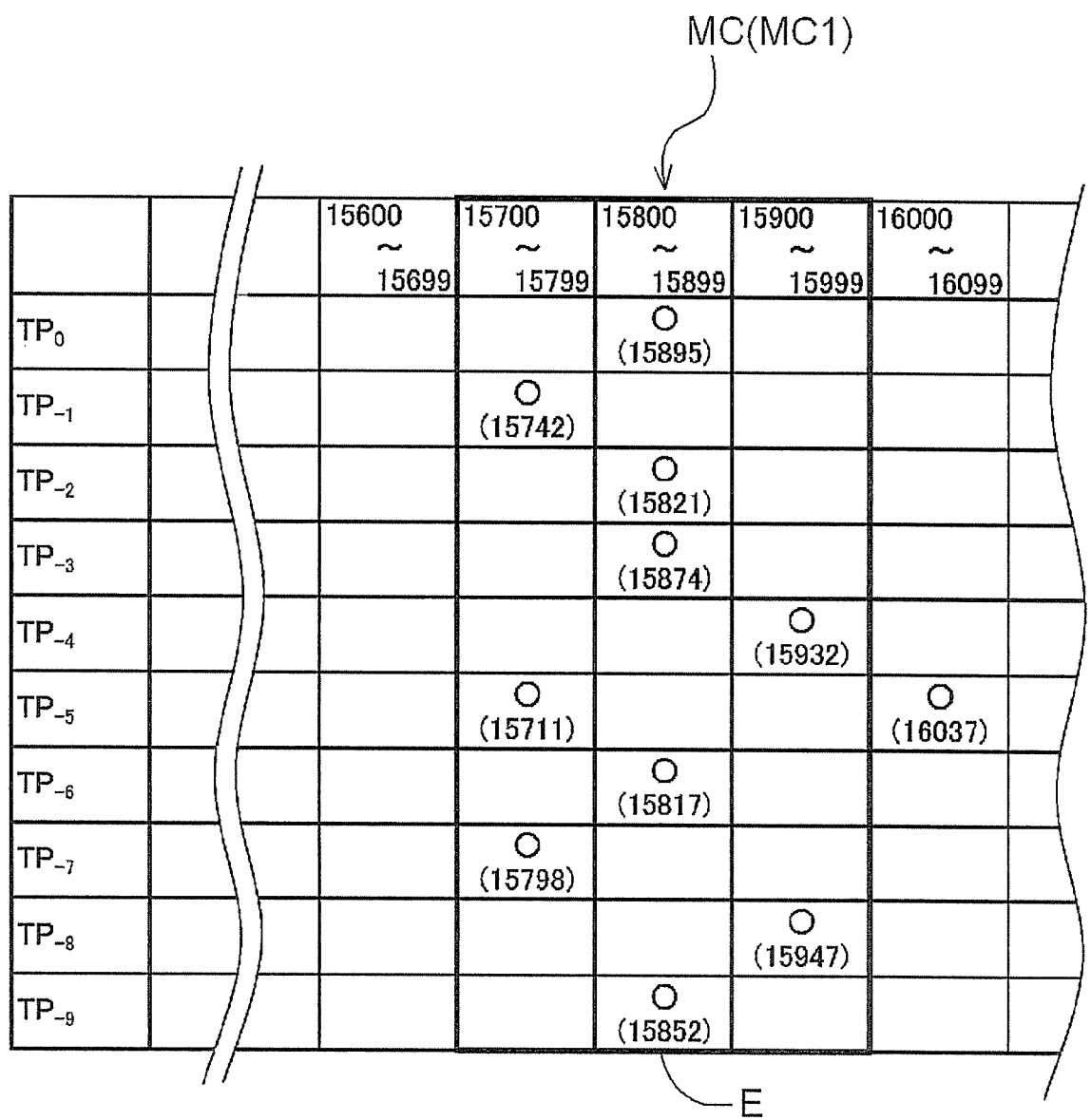
FIG. 16 is an explanatory diagram showing a principle for averaging the receipt times.

FIG. 16 is an explanatory diagram showing a principle for averaging the receipt time $t_R$ and schematically showing an averaging table MC. The averaging table MC is divided into predetermined ranges, and the receipt times $t_R$, corresponding to each divided range, are mapped therein. In an example shown in FIG. 16, the predetermined range is divided every 100 of the counter value of the main counter. In FIG. 16, the receipt time $t_R$ of the candidate point detected at the latest transmission timing ($TP_0$) corresponds to 15895, which is used as the examples shown in FIGS. 7 to 10. Consequently, the receipt time $t_R$ is classified into a zone of the counter value 15800 to 15899. Similarly, the receipt times $t_R$ of the candidate points, obtained from one previous transmission timing ($TP_{-1}$) to the ninth previous transmission timing ($TP_{-9}$), are mapped.

At the past ten transmission timings, five candidate points are mapped in the zone of the counter value 15800 to 15899. Three candidate points are mapped in an adjacent zone, i.e. a zone of the counter value 15700 to 15799, and two candidate points are mapped in a zone of the counter value 15900 to 15999. The received signal is determined to be the reflected wave from an object when a certain number, four in this case, or more of candidate points exist in the zone. When only three or less of the candidate points exist in the zone, the following determination is made: (1) the candidate points in the zone are noise, (2) the receipt time $t_R$ is not accurately detected due to errors even if the candidate points in the zone are the reflected waves from objects.

Here, a predetermined range, including the zone in which a certain number or more of the candidate points exist, is labeled as an averaging range E. In the example shown in FIG. 16, three zones, i.e. the zone in which four or more candidate points exist and two zones which are located adjacent to the foregoing zone, are labeled as the averaging range E. In this example, the averaged received time $t_R$ corresponds to 15839, and the position of the object is detected base on the value, i.e. 15839.

As for averaging methods, other operation methods, such as weighted average method, may be employed. In weighted average method, the candidate points in a center zone are weighted. In the embodiment, for ease of explanation, the zones, in which the candidate points are to be mapped, are set in advance. However, it is not necessary to set the zones in advance. For example, the averaging may be conducted by setting the obtained receipt times $t_R$ as the base and detecting the candidate points which have the receipt times $t_R$ in a predetermined period including previous and subsequent zones of the base zone (The averaging range E). This type of method is a know method proposed by the same inventor as the present invention and disclosed in JP 2007-322225A. Thus, detailed description will be omitted.

As described above, the ultrasonic wave is transmitted by the transmitter 21 in accordance with the timing pulse TP output from the operation portion 26 at the time corresponding to the counter value 0, and then the ultrasonic wave is reflected from the object. The receipt time $t_R$ is defined as a time when the receiving portion 24 receives the reflected wave via the receiver 22. Thus, the difference between the receipt time $t_R$ and the output time of the timing pulse TP is equivalent to a time period that the ultrasonic wave makes a round trip between the sensor head 20 and the object. In the example shown in FIG. 16, the round trip time corresponds to the counter value $t_R$ and thus corresponds to 15839. In the embodiment, the counter value 1 is set to 250 ns. Consequently, the round trip time is approximately 3.98 ms, and the one-way trip time is 1.99 ms. Since the sonic speed is approximately 340 m/s, the distance of the one-way trip is approximately 67.7 cm.

In the foregoing description, the principle that the ultrasonic sensor 2 detects a distance to the object is described in detail. As stated in the beginning of the description of the principle, a known method such as trigonometric survey may be used to detect the position of the object. Thus, the distance between the ultrasonic wave sensor 2 and the object have to be measured in different receiving positions. In other words, the distances between the object and the respective receivers 22, disposed at different locations, have to be measured.

Figure 18:
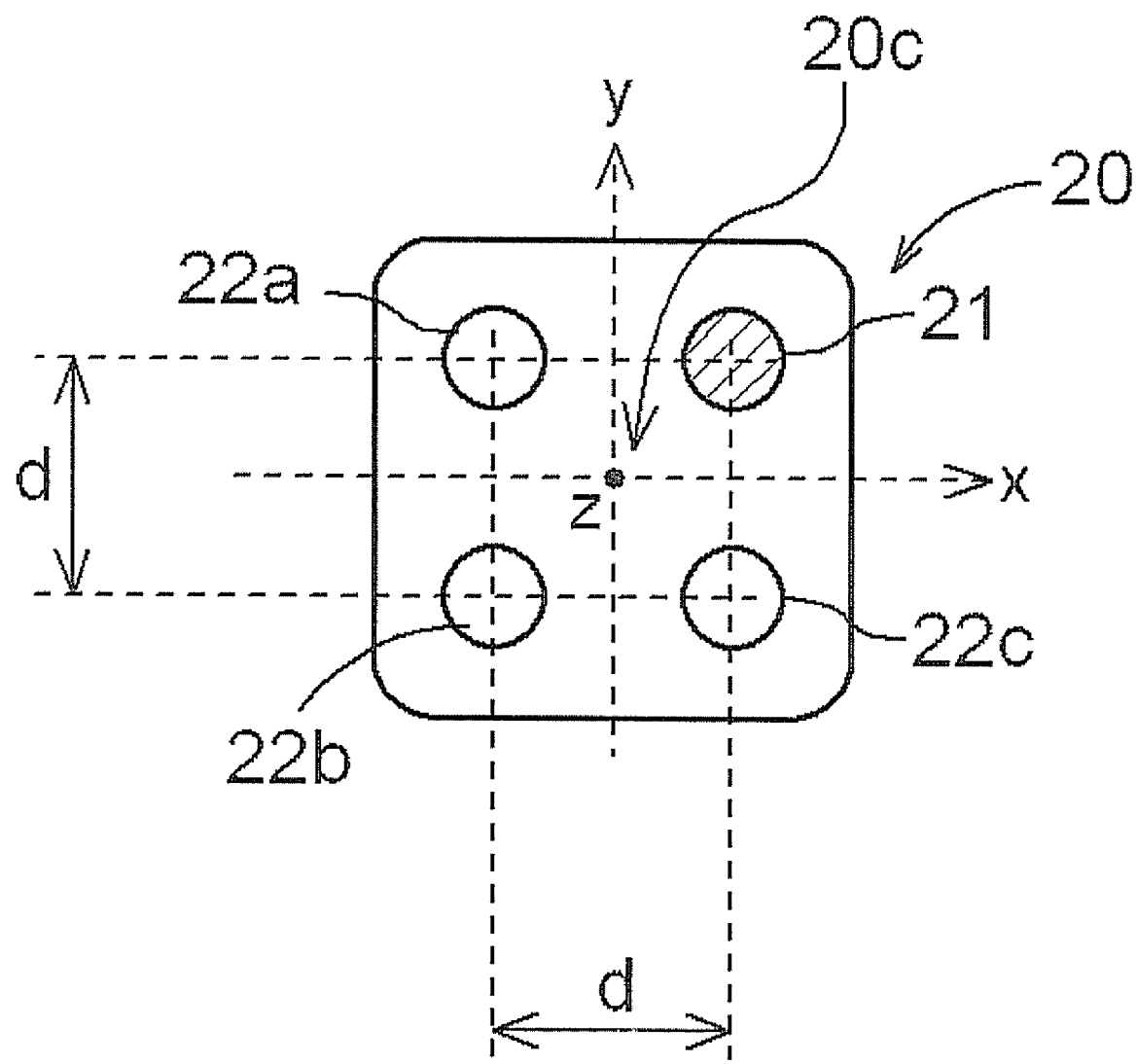
FIG. 18 is an explanatory diagram schematically showing an example of a sensor head of the ultrasonic wave sensor.

FIGS. 17 and 18 show a configuration of the ultrasonic wave sensor 2 which is suitable for detecting the object position. As shown in FIGS. 17 and 18, the ultrasonic wave sensor 2 includes four oscillating portions, i.e. one transmitter 21 and three receivers 22a, 22b, and 22c. The ultrasonic wave sensor 2 includes the three receivers 22a, 22b, and 22c, thereby three-dimensionally detecting the position of the obstacles.

The four oscillating portions are disposed in a manner that one oscillating portion is positioned at each vertex of a square. A length of one side of the square, i.e. an interval between the adjacent vibrating portions, is referred to as an interval d. The smaller the interval d becomes, the higher the resolution for detecting the object becomes. However, if the interval d is narrow, the oscillating portion is likely to be subject to the influence from the other oscillating portions. Thus, the interval d is appropriately set. Further, ½ wavelength of the transmitted wave is set to a value which is sufficiently smaller than the interval d of the oscillating portion. For example, the interval d may be set approximately 10 to 12 mm. When the frequency of the transmitted wave is 40 kHz, the wavelength is 8.5 mm and the ½ wavelength is 4.25 mm. Hence, the value of the ½ wavelength is sufficiently smaller than the interval d of the oscillating portion to secure the resolution. In FIG. 18, a X-axis and a Z-axis are respectively arranged along a vehicle width direction and the center axis C which is arranged along the transmission direction of the ultrasonic wave sensor 2. Further, a Y-axis is arranged along a direction which intersects the X and Z-axes and the Z-axis penetrates through a centroid 20c of the square in which the four oscillating portions are disposed.

As shown in FIG. 17, the ultrasonic wave sensor 2 includes three receiving portions 24a, 24b, and 24c corresponding to the three receivers 22a, 22b, and 22c and further includes three detecting portions 25a, 25b, and 25c corresponding to the three receiving portions 24a, 24b, and 24c. As shown in FIG. 18, the three receivers 22a, 22b, and 22c are located at different positions. Thus, the distances between the object and the respective receivers 22a, 22b, and 22c differ, and the different receipt times $t_R$, detected and determined by the three detecting portion 25a, 25b, and 25c, are obtained. The geometric relationship among the three receivers 22a, 22b, and 22c has been input to the operation portion 26 at this point. Hence, the operation portion 26 is able to detect a direction of the object by means of a known trigonometric based on the distances between the object and the respective receivers 22a, 22b, and 22c and the geometric relationship among the three receivers 22a, 22b, and 22c. Such a method is a known method proposed by the same inventor as the present invention and is disclosed in JP 2008-8851A and other publications. Therefore, detailed description will be omitted.

The operation portion 26 detects the peak(s), obtains the approximate line L, detects the receipt times(s) $t_R$, and averages the receipt times $t_R$, which are detected multiple times so as to correspond to the multiple transmission timings. Hence, as shown in FIG. 19, the multiple ring buffers MA, the multiple candidate maps MB, and the multiple average tables MC are provided to correspond to the three receivers 22a, 22b, and 22c. Thus, the ring buffers MA1, MA2, and MA3, the candidate point maps MB1, MB2, and MB3, and the averaging tables MC1, MC2, and MC3 are provided to correspond to the three receivers 22a, 22b, and 22c.

When the candidate points of the object are obtained by applying the principle or features of the present invention, as shown in FIGS. 13 and 14, the receipt time $t_R$ of the reflected wave, which is hid by the superposed waves and is not detected by a known sensor, is more likely to be detected. In other words, a larger number of the candidate points are detected than a known sensor. Whether or not the candidate points obtained via the three receivers 22a, 22b, and 22c indicate one identical object may be determined by checking if a difference between the peak times $t_P$ for the candidate points is in a predetermined range. Thus, the combination of the candidate points and the object, to which the candidate point point, is determined based on the difference of the peak times $t_P$. The method for determining the combination is a known method proposed by the same inventor as the present invention and is disclosed in JP 2007-322226A. Thus, detailed description will be omitted.

As described above, the object detecting apparatus, which accurately detects the receipt time of the received wave and improves the precision for detecting the object, is provided.

The application of the invention is not limited to the ultrasonic wave sensor. The features of the invention may be applied to the systems which obtains the envelope from the oscillating waveform and analyzes the waveform of the envelope to determine physical phenomena. For example, the features of the invention may be used in a method of detecting the upstroke of the envelope by obtaining the envelope from an oscillating waveform of a piezoelectric sensor or an acceleration sensor and detecting an upstroke starting time of the envelope, provided that a predetermined direction of the envelope is set to an increasing direction.

The upstroke detecting method includes a process that detects the peaks in a direction that the envelope increases, and the process is similar to the foregoing peak detecting process. Further, the upstroke detecting method includes a process that obtains an approximate line with a maximum amount of change of the envelope in a change amount increasing period set to a gradient of the approximate line, provided that the change amount increasing period is a defined as a time period in which an amount of change per a predetermined unit time of the envelope heading to the peak continues to increase, and the process is similar to the foregoing approximate line obtaining process. Furthermore, the upstroke detecting method includes an upstroke starting time obtaining process that obtains a time that a value of the approximate line equals a predetermined reference value as an upstroke starting time. Here, the upstroke starting time corresponds to the foregoing receipt time and the upstroke detecting method corresponds to the foregoing receipt time obtaining process.

In the foregoing embodiment, the peak P means an electric potential difference from the reference voltage in either positive or negative direction. In other words, the peak P may be obtained in a direction that the amplitude of the reflected wave increases. A wave-height of an oscillatory wave, i.e. the sum of the amplitudes in both the positive and negative directions, is generally referred to as a peak-to peak amplitude. Namely, there would be no problem whether the positive peak or the negative peak is used in the calculation.

According to the foregoing embodiment, the approximate line L is obtained, with the maximum amount of change in the change amount increasing period of the envelope heading to the peak P set to the gradient of the approximate line L. In case that the approximate line L is obtained by using the least squares approximation, even if the approximate line L is obtained by using the sample base, an error of the obtained approximate line L increases when the waveform of the envelope is distorted. However, in the embodiment of the present invention, the approximate line L is obtained with the maximum amount of change set to the gradient of the approximate line L in the change amount increasing period. Thus, the approximate line L is not subject to the influence of the distortion of the waveform and the error of the obtained approximate line L is significantly restrained. Since the approximation line L is obtained with high precision, the precision of the receipt time $t_R$ obtained based on the approximate line L and the reference voltage VZ improves. As a result, the object detecting apparatus which accurately obtains the receipt time $t_R$ of the received wave and improves the detection precision of the object, is provided. Further, the above-describe manner for obtaining the approximate line L allows the apparatus to obtain the approximate line L with far fewer operations, compared to the least squares approximation. Therefore, the load of the operation portion 26 is reduced.

According to the foregoing embodiment, when the envelope heading to the peak P includes the multiple change amount increasing periods, the operation portion 26 obtains the approximate line L for each change amount increasing period and obtains the multiple receipt times $t_R$ based on the respective approximate lines L obtained.

The reflected waves from the multiple objects may superpose on the envelope 5. In such a case, multiple inflection points exist in the envelope 5 heading to the peak P. In other words, the foregoing change amount increasing period appears more than once at intervals when the envelope 5 decreases. When the envelope 5 includes the reflected waves from the multiple objects, it is desirable that the receipt times $t_R$, corresponding to the reflected waves, are obtained. If the operation portion 26 obtains the approximate lines L, corresponding to the respective change amount increasing periods, and detects the receipt times $t_R$ based on the respective approximate lines L. Thus, the receipt times $t_R$ of the reflected waves from the objects are detected. As a result, the object detecting apparatus detect the positions of the multiple objects with high precision. Further, as described above, the object detecting apparatus obtains the approximate line L with fewer operations, compared to the least squares approximation. For the reason, even if the multiple approximate lines L, and receipt times $t_R$ are obtained for one envelope, the load of the operation will not increase significantly.

According to the foregoing embodiment, the operation portion 26 detects the peak P when the envelope 5 increases for the predetermined increasing period and then decreases, provided that the given direction of the envelope 5 is set as the increasing direction.

The operation portion 26 detects the peak P when the envelope 5 increases over the predetermined increasing time and then decreases. Hence, even if the reflected waves from multiple objects superpose on the envelope 5 and appear as one envelope, the peaks P of each reflected wave are detected.

According to the foregoing embodiment, when the voltage value of the envelope 5 measured at the sampling time, which is set every predetermined sampling period TS set as the predetermined unit time, increases two consecutive times and then decreases, the operation portion 26 sets the sampling time before the decrease to a peak time $T_P$ and the voltage value at the peak time is regarded as a peak voltage value $V_P$.

The digital signal processing using discrete data is conducted for obtaining the peak voltage value $V_P$ based on the voltage values measured at the sampling times, which are respectively set at the predetermined sampling periods TS. It is desirable to conduct the calculations for obtaining the approximate line L and the receipt time $t_R$ and detecting the object position by digital operations using a microprocessor or a group of logic circuits. For the reason, it is advantageous to obtain the peak voltage value $V_P$ by the digital signal processing for good compatibility with the processing in the subsequent state. Further, the peak time $t_P$ and the peak voltage are detected when the voltage value increases two consecutive times and then decreases. The conditioning suppresses the possibility that the peak P is detected from the envelope 5 obtained from a received signal generated by small oscillations caused by an effect such as a noise.

According to the foregoing embodiment, the operation portion 26 obtains the approximate line L based on the voltage value measured at the sampling time within the predetermined time period before the peak time $t_P$.

The operation portion 26 detects the presence of the peak and obtains the receipt time $t_R$ corresponding to the peak P. Thus, the receipt time $t_R$ is obtained with high precision.

According to the foregoing embodiment, the operation portion 26 obtains the difference between the voltage values measured at the two consecutive sampling times as the amount of change, and when the difference increases the two consecutive times and then decreases, the operation portion 26 sets the difference before the decrease as the maximum value of change in the change amount increasing period.

When the difference consecutively decreases or increases (including a case that the difference does not change), the envelope 5 is formed without having the inflection points. On the other hand, when the difference turns from the decrease to the increase, or from the increase to the decrease, the envelope 5 is formed having the inflection points. When the difference increases two consecutive times and then decreases, the inflection points exist in the envelope 5. Hence, it is desirable to obtain the approximate line L at this point. Further, the time period that the difference increases two consecutive times before the decrease is defined as the change amount increasing period, and the difference taken before the decrease is larger than the previous difference. Thus, if the sampling period TS is set as the predetermined unit time, the difference taken before the decrease should be the maximum amount of change in the change amount increasing period. As just described, the detection of the inflection points and the maximum amount of change are simultaneously conducted by the digital signal processing. Furthermore, the gradient of the approximate line L is simultaneously obtained by assigning the sampling period to a denominator.

According to the foregoing embodiment, the operation portion 26 stores the predetermined number of receipt times $t_R$ obtained corresponding to the multiple transmission timings and averages the receipt times $t_R$ included in a predetermined averaging range to detect the position of the object based on the averaged receipt time.

Even if the received waves are reflected from the same object, the received waveforms at the receiving portion 24 are not uniform, resulting in variations in the receipt times $t_R$. Since the direction and amount of the variations are different in the multiple receivers 22a, 22b, and 22c the variations affect the precision of the object position detection conducted based on the receipt time $t_R$. If the receipt times $t_R$ obtained for the multiple transmission timings are averaged, the variations of the receipt times $t_R$ are restrained. Further, the variations of the difference between the receipt times $t_R$ in the multiple receivers 22a, 22b, and 22c are restrained, thus obtaining the object position stably. Furthermore, the inflection points on the envelope may be caused due to noise. If these inflection points are not included in the predetermined averaging range, the receipt times obtained for the inflection points are not used for the object position detection. Therefore, the object detecting apparatus, which restrains noise and detects the object position with high accuracy, are provided.

When the pivotal opening and closing body opens or closes, the end portion 12a of the opening and closing body largely moves. Hence, the end portion 12a is likely to come in contact with an object existing in the moving direction. Since the object detecting apparatus is included in the opening and closing control system which controls the operation of the opening and closing body for the vehicle 1, the object existing around the opening and closing body, i.e. an obstacle, is detected when the opening and closing body opens or closes. Further, the object detecting apparatus is disposed so as to include the surface 12A of the opening and closing body in the detection range. Hence, the end portion of the opening and closing body, which moves largely during the opening or closing operation, is sufficiently included in the detection range. The control portion drives the driving portion based on the detection result of the object detecting apparatus. Thus, when the object is detected in the vicinity of the opening and closing body, the control, such as termination of the opening or closing operation, is appropriately conducted. As a result, the possibility that the object contacts the opening and closing body during the opening or closing operations is restrained.

Here, the peak P means the electric potential difference from the reference voltage in either positive or negative direction. In other words, the peak P may be obtained in a direction that the amplitude of the reflected wave increases. A waveheight of an oscillatory wave, i.e. the sum of the amplitudes in both the positive and negative directions, is generally referred to as a peak-to peak amplitude. Namely, there would be no problem whether the positive peak or the negative peak is used.

According to the foregoing embodiment, the approximate line L is obtained with the maximum change amount in the change value increasing period of the envelope heading to the peak P set to the gradient of the approximate line L. In case that the approximate line L is obtained by using the least squares approximation, even if the approximate line L is obtained by using the same references, an error of the obtained approximate line L increases when the waveform of the envelope is distorted. However, in the embodiment of the present invention, the approximate line L is obtained with the maximum amount of change set to the gradient of the approximate line L in the change amount increasing period. Thus, the approximate line L is not subject to the influence of the distortion of the waveform and the error of the obtained approximate line L is significantly restrained. Since the approximation line L is obtained with high precision, the precision of the upstroke starting time obtained based on the approximate line L and the reference voltage improves. Further, the above-describe manner for obtaining the approximate line L allows the apparatus to obtain the approximate line L with far fewer operations, compared to the least squares approximation. Therefore, the load of the operation portion 26 is reduced. The method of detecting the upstroke of the envelope 5 may be applied to the foregoing object detecting apparatus, and has the features and benefits of the object detecting apparatus.

The principles, of the preferred embodiments and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. An object detecting apparatus detecting a position of an object based on a reflected wave generated by reflection of a transmitted ultrasonic wave from the object, the object detecting apparatus comprising:
   a transmitting portion controlling a transmitter to transmit the ultrasonic wave at predetermined transmission timings;
   a receiving portion receiving the ultrasonic waves, reaching a plurality of receivers located at different positions, as received signals of the plurality of receivers;
   a detecting portion detecting an envelope of each received signal; and
   an operation portion detecting a peak of each envelope and obtaining an approximate line with a maximum amount of change of the envelope in a change amount increasing period set to a gradient of the approximate line, provided that the change amount increasing period is defined as a time period in which an amount of change per a predetermined unit time of the envelope, heading to the peak, continues to increase, the operation portion obtaining a time that a voltage value of the approximate line equals a predetermined reference value as a receipt time of the reflected wave and detecting the position of the object based on the receipt time obtained from each envelope.

2. An object detecting apparatus according to claim 1, wherein when the envelope heading to the peak includes the plurality of change amount increasing periods, the operation portion obtains the approximate line for each change amount increasing period and obtains the plurality of receipt times based on the respective approximate lines obtained.

3. An object detecting apparatus according to claim 1, wherein the operation portion detects the peak when the envelope increases for a predetermined increasing period and then decreases, provided that a given direction of the envelope is set as an increasing direction.

4. An object detecting apparatus according to claim 1, wherein when the voltage value of the envelope measured at a sampling time, which is set every predetermined sampling period set as the predetermined unit time, increases two consecutive times and then decreases, the operation portion sets the sampling time before the decrease to a peak time and the voltage value at the peak time is regarded as a peak voltage value.

5. An object detecting apparatus according to claim 4, wherein the operation portion obtains the approximate line based on the voltage value measured at the sampling time within a predetermined time period before the peak time.

6. An object detecting apparatus according to claim 4, wherein the operation portion obtains a difference between the voltage values measured at two consecutive sampling times as the amount of change, and when the difference increases two consecutive times and then decreases, the operation portion sets the difference before the decrease as the maximum value of change in the change amount increasing period.

7. An object detecting apparatus according to claim 1, wherein the operation portion stores a predetermined number of receipt times obtained corresponding to the multiple transmission timings and averages the receipt times included in a predetermined averaging range to detect the position of the object based on the averaged receipt time.

8. An opening and closing control system for a vehicle, comprising:
- a driving portion driving a vehicle opening and closing body to pivotally open or close; and
- a control portion driving the driving portion to control operation of the opening and closing body, wherein an object detecting apparatus comprises:
- a transmitting portion controlling a transmitter to transmit the ultrasonic wave at predetermined transmission timings;
- a receiving portion receiving the ultrasonic waves, reaching a plurality of receivers located at different positions, as received signals of the plurality of receivers;
- a detecting portion detecting an envelope of each received signal; and
- an operation portion detecting a peak of each envelope and obtaining an approximate line with a maximum amount of change of the envelope in a change amount increasing period set to a gradient of the approximate line, provided that the change amount increasing period is defined as a time period in which an amount of change per a predetermined unit time of the envelope, heading to the peak, continues to increase, the operation portion obtaining a time that a voltage value of the approximate line equals a predetermined reference value as a receipt time of the reflected wave and detecting the position of the object based on the receipt time obtained from each envelope, wherein the object detecting apparatus is disposed at the opening and closing body in a manner that a surface of the opening and closing body lies within a detection range, and the control portion drives the driving portion based on a detection result of the object detecting apparatus to control the operation of the opening and closing body.

9. A method of detecting an upstroke of an envelope that obtains the envelope of a reflected wave to detect an upstroke starting time of the envelope heading in an increasing direction, provided that a given direction of the envelope is set as the increasing direction, for detecting a position of an object based on the reflected wave generated by reflection of a transmitted ultrasonic wave from the object, the method of detecting the upstroke of the envelope comprising the steps of:
- a peak detecting process detecting a peak in the increasing direction of the envelope;
- an approximate line obtaining process obtaining an approximate line with a maximum amount of change of the envelope in a change amount increasing period set to a gradient of the approximate line, provided that the change amount increasing period is defined as a time period in which an amount of change per a predetermined unit time in the envelope heading to the peak continues to increase; and
- an upstroke starting time obtaining process obtaining a time that a value of the approximate line equals a predetermined reference value as an upstroke starting time.

* * * * *